US 9,066,036 B2

(12) United States Patent
Chen et al.

(10) Patent No.: US 9,066,036 B2
(45) Date of Patent: Jun. 23, 2015

(54) DETERMINING TRANSPARENT FILLS BASED ON A REFERENCE BACKGROUND COLOUR

(71) Applicant: Canon Kabushiki Kaisha, Tokyo (JP)

(72) Inventors: Yu-Ling Chen, Epping (AU); James Austin Besley, Killara (AU); Steven Richard Irrgang, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/715,554

(22) Filed: Dec. 14, 2012

(65) Prior Publication Data

US 2013/0155475 A1 Jun. 20, 2013

(30) Foreign Application Priority Data

Dec. 20, 2011 (AU) ................................ 2011265380

(51) Int. Cl.
| | |
|---|---|
| *H04N 1/46* | (2006.01) |
| *H04N 1/40* | (2006.01) |
| *G06T 5/00* | (2006.01) |
| *G06T 11/40* | (2006.01) |

(52) U.S. Cl.
CPC ............ *H04N 1/40093* (2013.01); *G06T 5/005* (2013.01); *G06T 2207/10024* (2013.01); *G06T 2207/30176* (2013.01); *G06T 11/40* (2013.01)

(58) Field of Classification Search
None
See application file for complete search history.

(56) References Cited

U.S. PATENT DOCUMENTS

| | | | |
|---|---|---|---|
| 7,536,048 B2 | 5/2009 | Moravec et al. | |
| 7,826,112 B2 | 11/2010 | Sawada | |
| 7,880,924 B2 | 2/2011 | Lowman et al. | |
| 2003/0193512 A1* | 10/2003 | Komagata | 345/629 |
| 2011/0148909 A1* | 6/2011 | Besley | 345/592 |
| 2011/0167081 A1* | 7/2011 | Kosaka et al. | 707/769 |

FOREIGN PATENT DOCUMENTS

| | | |
|---|---|---|
| WO | 2007/127085 A1 | 11/2007 |
| WO | 2010/114574 A1 | 10/2010 |

* cited by examiner

*Primary Examiner* — Vincent Rudolph
*Assistant Examiner* — Michael Burleson
(74) *Attorney, Agent, or Firm* — Canon U.S.A., Inc. IP Division

(57) ABSTRACT

Disclosed is a method of generating an electronic document having an enclosed region with a fill color. The method receives a digital representation of a source document, the source document containing an enclosed region and at least one corresponding background region, the enclosed region overlapping at least a portion of the background region. A fill color is determined for the enclosed region from the digital representation as is a reference background color for the enclosed region from the corresponding background region of the digital representation. The method assigns a transparent fill color to the enclosed region based on a comparison of the determined fill color for the enclosed region with the reference background color and stores enclosed region with the transparent fill color to generate an electronic document.

18 Claims, 23 Drawing Sheets

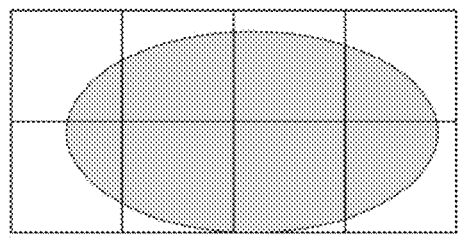 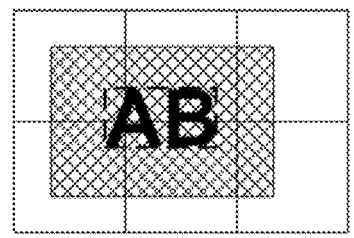
Fig. 7A    Fig. 7B
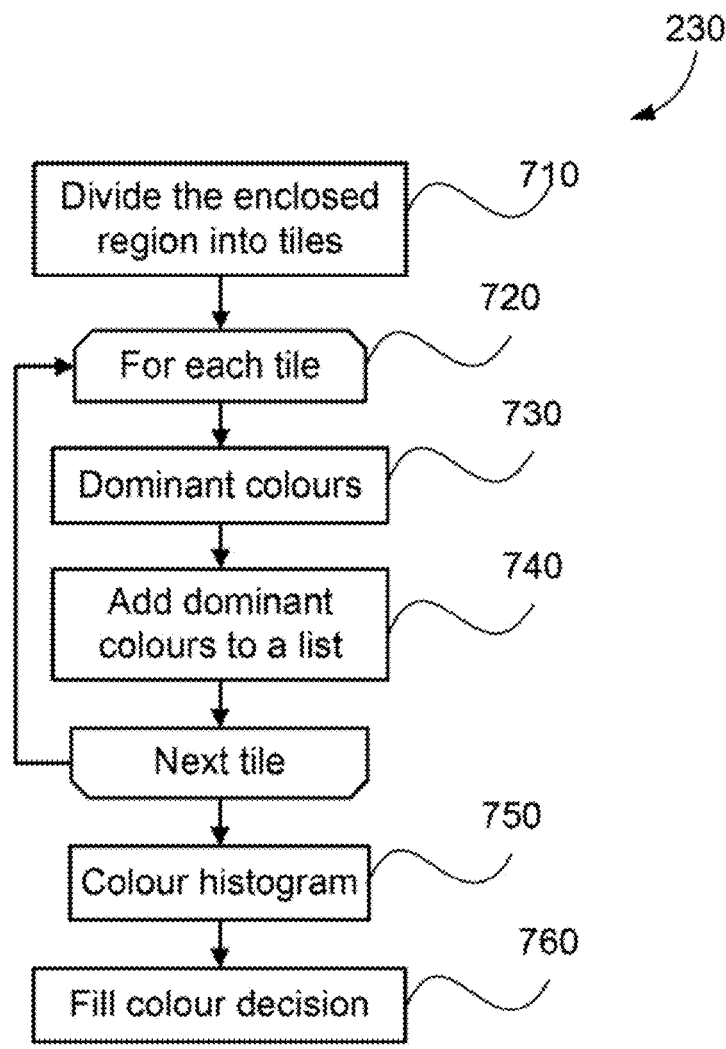
Fig. 7C

1610

1620

DETERMINING TRANSPARENT FILLS BASED ON A REFERENCE BACKGROUND COLOUR

REFERENCE TO RELATED PATENT APPLICATION

This application claims the benefit of priority afforded by the International (Paris) Convention and under 35 U.S.C. §119 of the filing date of Australian Patent Application No. 2011265380, filed Dec. 20, 2011, hereby incorporated by reference in its entirety as if fully set forth herein.

TECHNICAL FIELD

The current invention relates to converting a captured document image to a high level document and, in particular, to determining a fill colour for an enclosed region based on a reference background colour.

BACKGROUND

Document analysis systems analyse an image of a document to identify and extract content based information from various regions which collectively form the document. Typically, document analysis systems identify each of the various regions of the document and classify the regions as either text or non-text. This form of content based analysis is an important precursor to document management, synthesis and processing for display.

The proliferation of embedded document analysis on scanning devices and software-based document analysis systems has made conversion of a scanned document to a high level document, such as PDF, Word™, PowerPoint™ and Excel, increasingly common. As the accuracy of content extraction improves, the motivation of scan to high level document processing has gradually shifted from use for archiving to content reuse. Text content reuse has been well established due to the prevalence of optical character recognition (OCR), while other applications that perform non-text content reuse are still uncommon and are often fairly limited.

One incorrect interpretation of a scanned document may be caused by relative colour assignment among extracted non-text objects. Typically only a small set of colours were used in the original document to represent the non-text objects. However due to halftoning introduced during the printing process, the printed document may have a difference in colour from the original. As a result, the high level documents generated from a scan of the printed document will often have a noticeable colour discrepancy from the original document when the extracted non-text objects are compared. The most noticeable colour discrepancy is caused by a loss of highlight shading. For example, a table often has text with light shading to highlight column headings. The text shading is often removed from the extracted table during document analysis process found in existing conversion tools. A second noticeable colour discrepancy is that objects of the same colour in an original document may have different colours in the high level document.

These incorrect interpretations limit the scope of reuse of the extracted non-text content. As a result there is a need to alleviate the aforementioned problems in a document analysis system for scan-to-high-level-document applications.

SUMMARY

According to one aspect of the present disclosure there is provided a method of generating an electronic document having an enclosed region with a fill colour, the method comprising:

(a) receiving a digital representation of a source document, the source document containing an enclosed region and at least one corresponding background region, the enclosed region overlapping at least a portion of the background region;

(b) determining a fill colour for the enclosed region from the digital representation;

(c) determining a reference background colour for the enclosed region from the corresponding background region of the digital representation; and (d) assigning a transparent fill colour to the enclosed region based on a comparison of the determined fill colour for the enclosed region with the reference background colour.

Generally the enclosed region is stored with the transparent fill colour to generate an electronic document.

Preferably the source document comprises a plurality of enclosed regions including said enclosed region, the method comprising: (a) assigning a reference background flag to each of the plurality of enclosed regions based on a comparison of the determined fill colour for each of the enclosed regions with a corresponding reference background colour; and (b) storing background image data and, for each of the plurality of enclosed regions classified as a foreground region, storing a fill colour and reference background flag as an intermediate representation for the electronic document. Advantageously the method further comprises displaying the electronic document in one of a plurality of modes based on a selection to draw the background image, wherein the transparent fill colour is controlled by the selection. The method may also include: converting the electronic document to one of a plurality of formats based on a selection to output the background image data, wherein transparent fill colour is controlled by the selection. In another form the method may further comprise displaying the electronic document in one of a plurality of modes based on a predetermined option, wherein each mode is a configuration based on a selection to draw the background image and a selection to enable transparent fills. In one implementation the method may have the further step of converting the electronic document to one of a plurality of formats based on a predetermined option, wherein each format is a configuration based on a selection to output the background image data and a selection to enable transparent fills.

The reference background colour for the enclosed region can be a page colour of the source document. The reference background colour for the enclosed region can be determined according to a colour of a region that encloses the enclosed region. Advantageously the source document comprises a plurality of non-transparent enclosed regions, the method further comprising the step of consolidating fill colours of the plurality of non-transparent enclosed regions.

In another aspect, disclosed is a method of generating an electronic document having an editable table, the method comprising the steps of:

(a) receiving a digital representation of a source document, the document containing at least one table having a plurality of cells;

(b) determining a reference background colour for the table from the digital representation;

(c) determining a fill colour for each of the plurality of cells from the digital representation; and (d) assigning a transparent fill colour to at least one of the plurality of cells based on a comparison of the determined fill colour for the cell and the reference background colour of the table.

The reference background colour for the table can be a page colour of the source document. Alternatively the reference background colour for the table can be a colour of a region that encloses the table. This method may further comprise consolidating fill colours of at least two non-transparent cells of the plurality of cells based on a comparison of the determined fill colours of the at least two non-transparent cells.

In any of the methods the digital representation may comprise scanned data of the source document.

Other aspects are also disclosed.

BRIEF DESCRIPTION OF THE DRAWINGS

At least one embodiment of the present invention will now be described with reference to the following drawings, in which:

FIGS. 7A and 7B are examples used for describing fill colour determination;

FIG. 7C is a schematic flow diagram illustrating a method of fill colour determination for an enclosed region;

DETAILED DESCRIPTION INCLUDING BEST MODE

Figure 1:
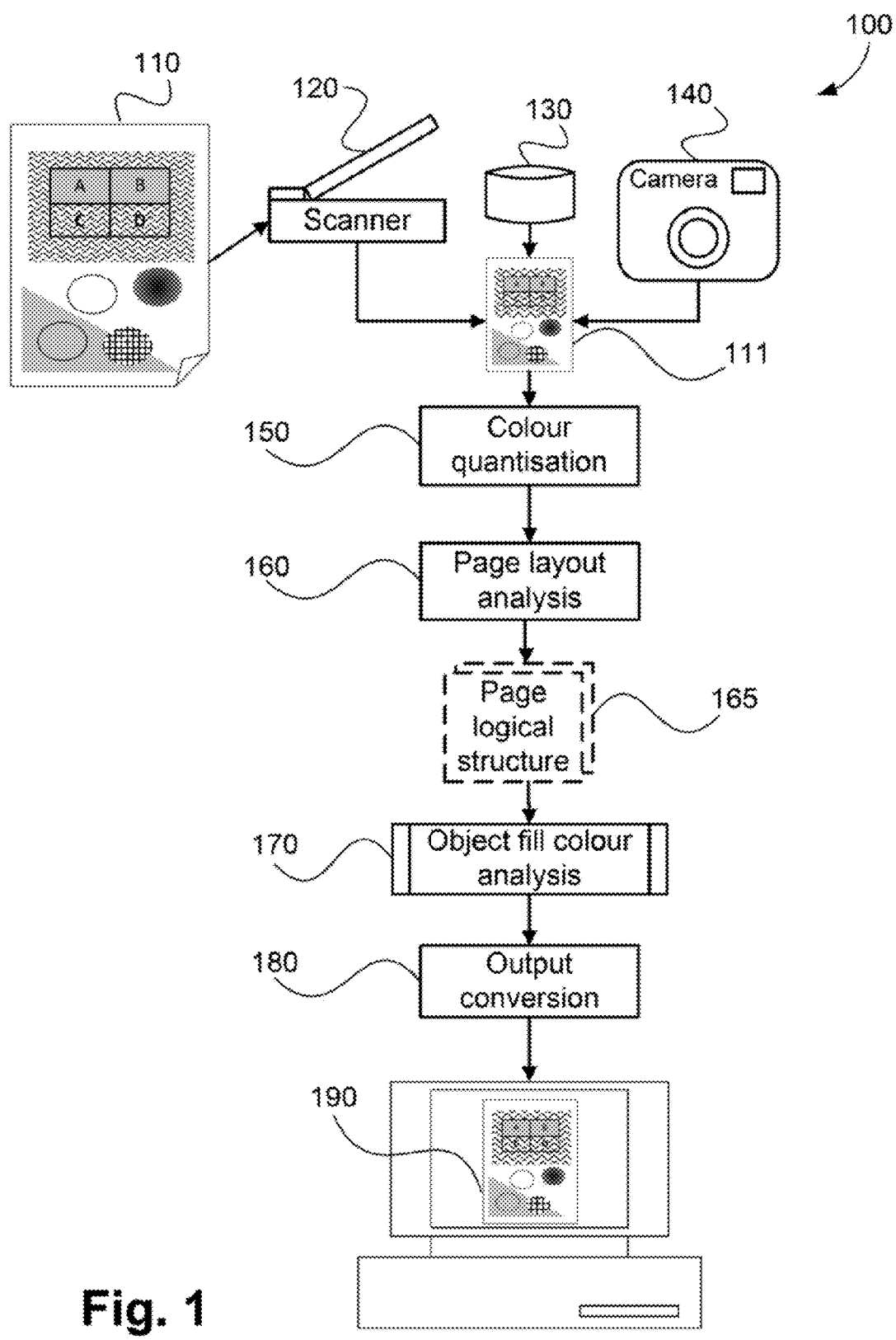
FIG. 1 is a functional block diagram of a system for converting a colour bitmap image of a colour document to a high level document.

FIG. 1 depicts a scan-to-high-level-document system 100 for converting a colour bitmap image of a colour document to a high level document. The system 100 processes a bitmap image 111 of an input source document 110 to produce a high level document 190. The high level document 190 may be an editable document such as in a format interpretable by computer applications such as Word™, PowerPoint™ or Excel, all marketed by Microsoft Corporation of USA, a Portable Document Format (PDF) file, a proprietary format created by Adobe Systems Inc., or a record stored in an electronic database, for example.

The input document image 111 can be provided by any of a variety of sources. In one configuration of the system 100, a scanner 120 scans a hardcopy document 110 to produce the input document image 111. In another configuration of the system 100, the input document image 111 may be retrieved from a data storage system 130, such as a hard disk having a database of images stored on the hard disk. In another configuration of the system 100, the input document image 111 is produced by digital photography using a camera or mobile phone 140. The foregoing are merely examples of how an input document image 111, i.e. a colour bitmap image, might be provided. For another example, a software application executable on a computing device might be used to generate the input document image 111 in PDF format.

Generally an input document image is pre-processed to reduce the input colour depth before page layout analysis. Common pre-processing methods are binarisation and colour quantisation. In one implementation, a colour quantisation module 150 is used to reduce the number of input colours to a small set of colours. A page layout analysis module 160 then performs page layout analysis to produce a page logical structure 165 to represent the identified high level objects such as text lines, tables and shapes on the page. The logical representation describes each object's content type and the geometric properties of the object and how all objects are assembled together to represent a page.

Figure 4A:
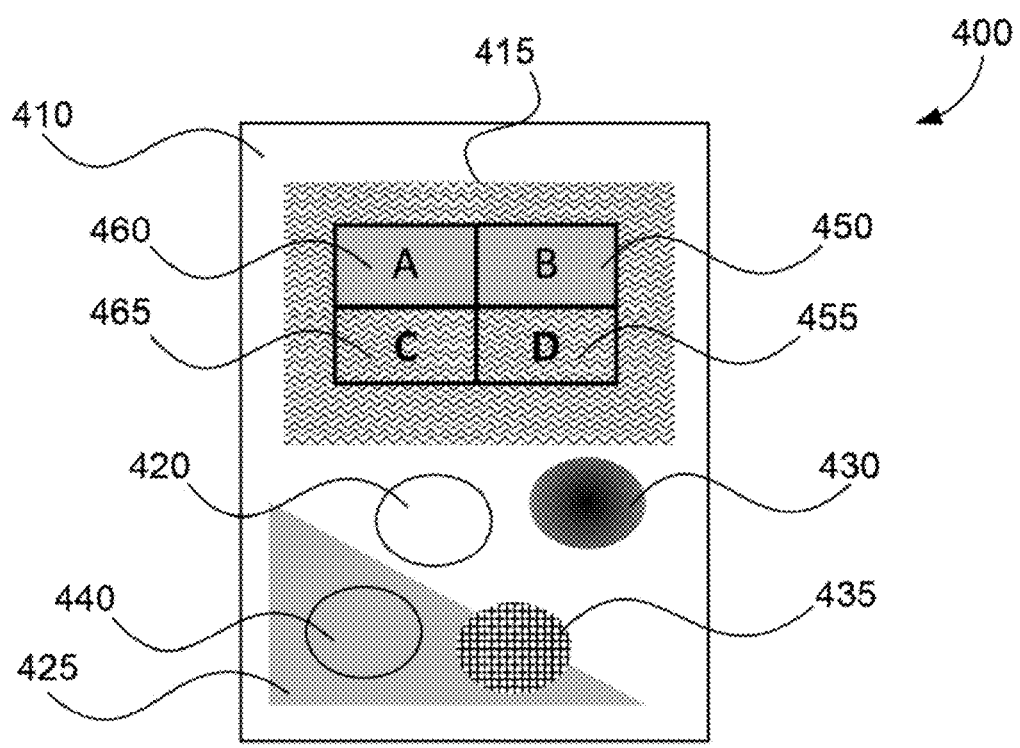
FIG. 4A is an example of a document containing some non-text objects and a table.
Figure 4B:
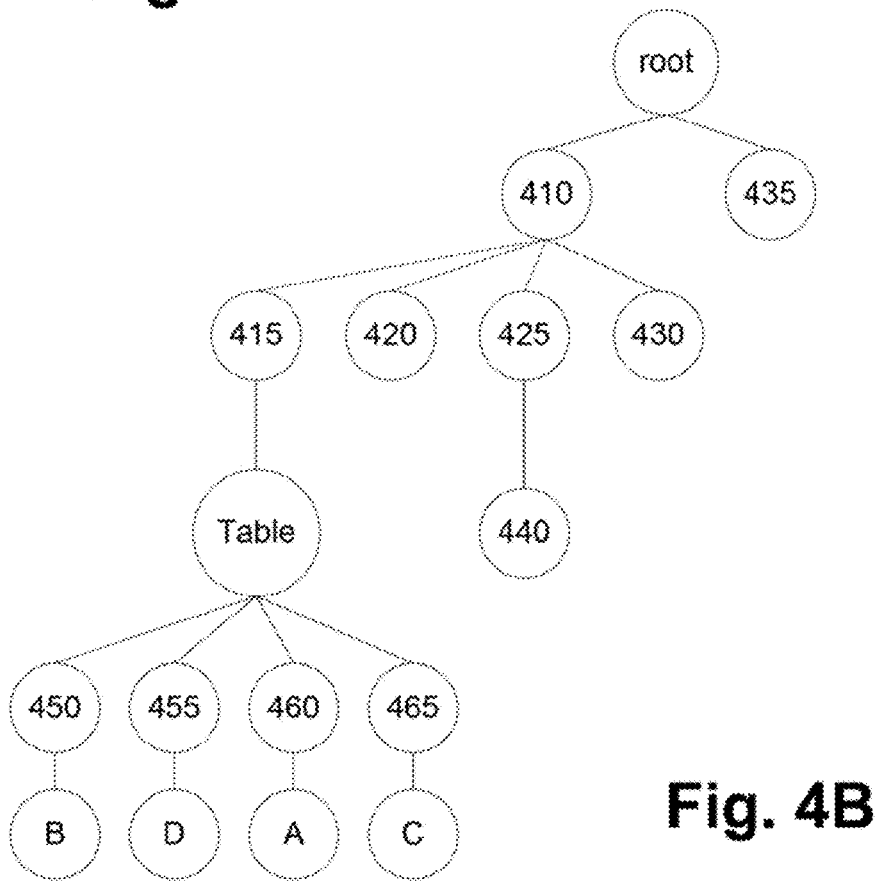
FIG. 4B is an example of the page logical structure tree from the example page in FIG. 4A.

FIG. 4A is an example of a document 400 containing some non-text objects and a table. FIG. 4B shows a logical structure output by the scan-to-high-level-document system 100 of FIG. 1 for the document 400 of FIG. 4A. Objects identified in the document 400 are placed in a tree with parent and child nodes, as seen in FIG. 4B, wherein a parent node represents an object that fully encloses a child node in terms of the area defined by their constituent pixels. Each node represents an object in the document 400 of a physical or logical region. A logical region is generally formed of multiple physical regions which are combined according to a semantic rule. For example, the node labelled "Table" in FIG. 4B is a logical region consisting of four physical regions, representing cells 450, 455, 460 and 465 of the table seen in FIG. 4A. A root node labelled "root", representing the document 400 is another logical region which includes a canvas 410 or background region, and a shape 435 seen in the document 400. Leaf nodes A, B, C, D are physical regions representing the identified text. Each physical region has geometric properties defined either by a bitmap or a list of vectors. A logical region does not have direct geometric properties and the area of the logical region is instead defined by a union of its children, i.e. the set of cells for a table.

Conventional scan-to-high-level-document systems generally finish once a logical structure for a page is produced, because all text contents of the page are assumed to be, or handled as black while all non-text contents, such as tables and diagrams are assumed to not have colour fills. However the prevalence of colour publishing has made the assumption for such conventional scan-to-high-level-document systems incorrect as the converted documents cannot faithfully represent the original document. As a result, modern scan-to-high-level-document systems employ extra steps to deal with fill colours for identified objects.

Returning to FIG. 1, in one implementation, an object fill colour analysis module 170 estimates a fill colour for each object in the page logical structure 165. The colours inside each object are examined in order to estimate an associated fill colour. In the scan-to-high-level-document system 100, an object is represented by an enclosed region. Each object is in turn assigned a corresponding background region. The fill colour of the assigned background region is used as a reference background colour for determining whether an object should have a fill colour or not. A colour consolidation process is performed for objects with a fill colour, so that colour differences between objects with the same original colour, introduced by the printing process, can be corrected. The colour consolidation process works on the assumption that only a small set of colours were used in the original document. Light shadings can be maintained during the colour consolidation process, rather than being consolidated to background colour, as only objects with a fill colour go through the colour consolidation process. Objects without a fill colour will remain transparent on the output. This gives a correct interpretation of all objects without limiting the scope of how the objects may be reused. For example, a transparent object can be moved around without occluding the objects behind. The fill colour information for each object is added to the object in the page logical structure. In a final stage of the scan-to-high-level-document system an output conversion module 180 converts the analysed objects to a suitable format for use with a suitable computer application such as those mentioned above. A converted document 190 generated from the input document image 111 may be displayed or edited on a computer.

In the example of FIG. 4A, an enclosed region is defined by a shape boundary, such as a line or a path (for shapes without borders), that encloses a region that can be a different colour, for example by means of an alternate fill. An enclosed region is a physical region described by a node in the page logical structure tree as shown in FIG. 4B. Specifically, each of the regions 450, 455, 460 and 465 are enclosed regions as they are cells of a table in which the cells have delineated boundaries. Each of those cells/regions overlaps a background, in this case that formed by the shaded rectangle 415. Elliptical objects 420 and 430 also define enclosed regions by virtue of their respective borders and the colour within each object. The objects 420 and 430 overlap the canvas 410, which operates as a background region. The ellipse 440 has the triangle as its corresponding background region and the ellipse 435 has one portion thereof overlapping the triangle 425 as a corresponding background region, and another portion thereof overlapping the canvas 410 as a corresponding background region.

Figure 22A:
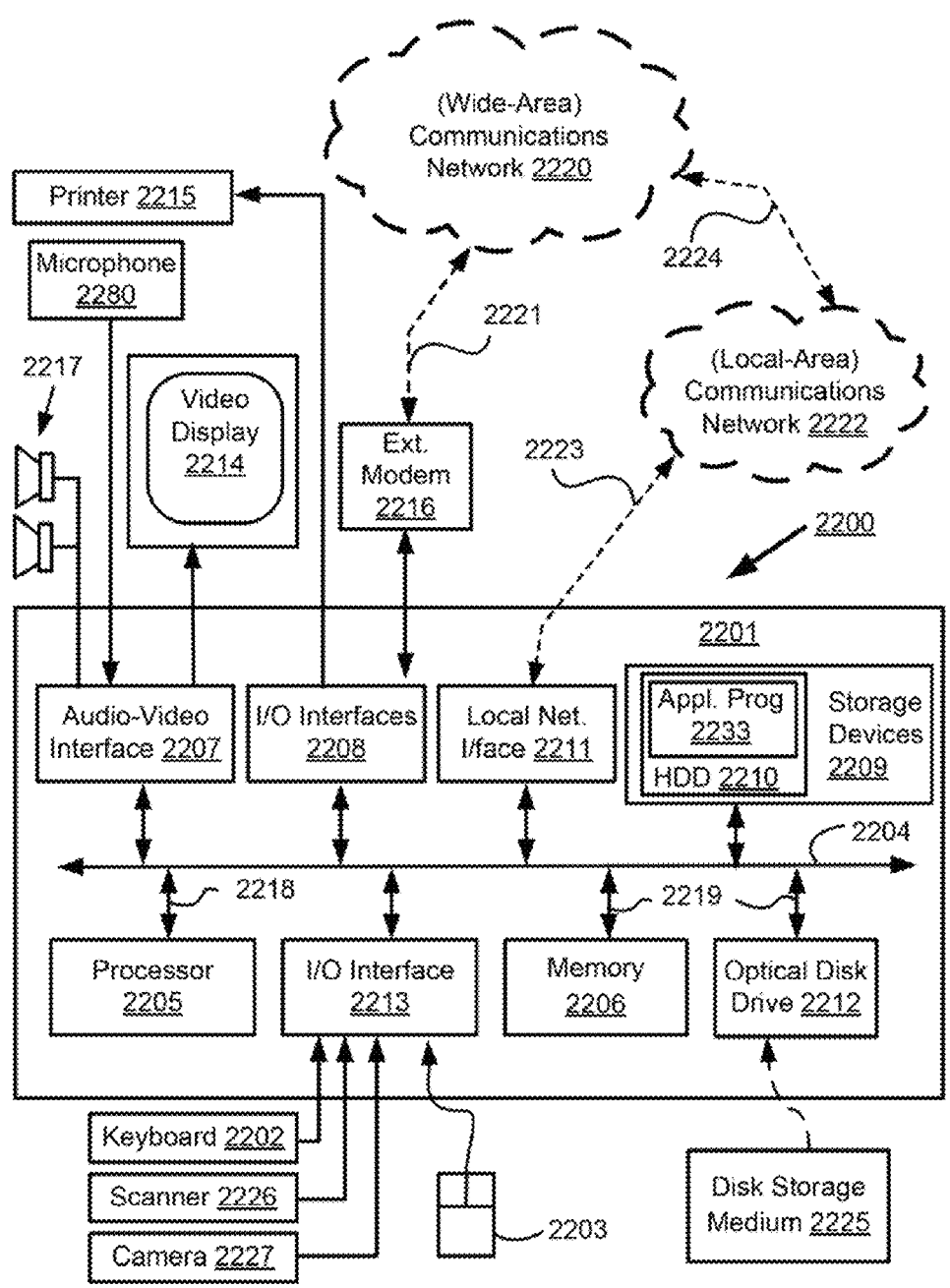
FIGS. 22A and 22B collectively form a schematic block diagram representation of an electronic device upon which described arrangements can be practised
Figure 22B:
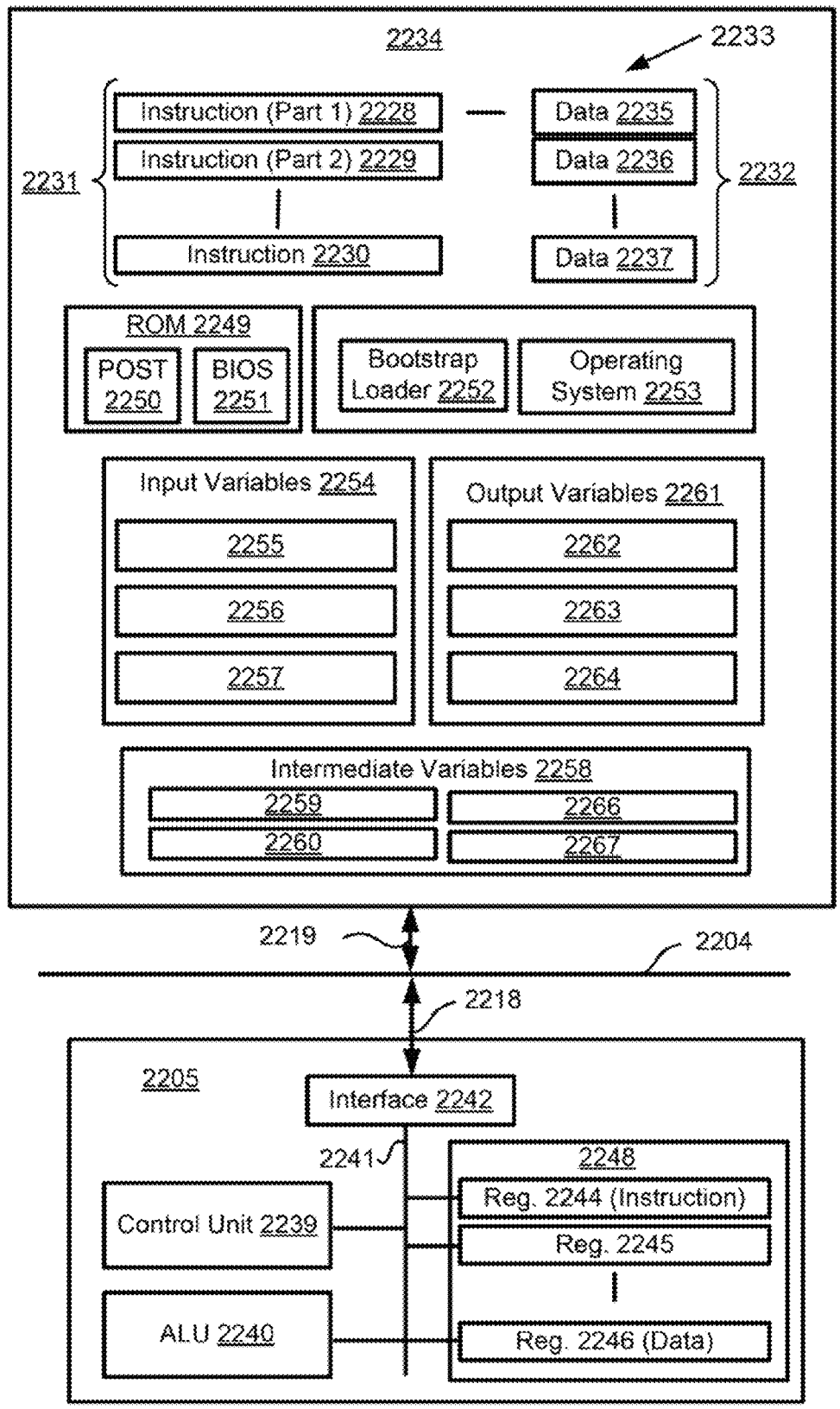

FIGS. 22A and 22B depict a general-purpose computer system 2200, upon which the various arrangements described can be practiced.

As seen in FIG. 22A, the computer system 2200 includes: a computer module 2201; input devices such as a keyboard 2202, a mouse pointer device 2203, a scanner 2226, a camera 2227, and a microphone 2280; and output devices including a printer 2215, a display device 2214 and loudspeakers 2217. An external Modulator-Demodulator (Modem) transceiver device 2216 may be used by the computer module 2201 for communicating to and from a communications network 2220 via a connection 2221. The communications network 2220 may be a wide-area network (WAN), such as the Internet, a cellular telecommunications network, or a private WAN. Where the connection 2221 is a telephone line, the modem 2216 may be a traditional "dial-up" modem. Alternatively, where the connection 2221 is a high capacity (e.g., cable) connection, the modem 2216 may be a broadband modem. A wireless modem may also be used for wireless connection to the communications network 2220.

In some embodiments, computer module 2201 includes at least one processor unit 2205, and a memory unit 2206. For example, the memory unit 2206 may have semiconductor random access memory (RAM) and semiconductor read only memory (ROM). The computer module 2201 also includes an number of input/output (I/O) interfaces including: an audio-video interface 2207 that couples to the video display 2214, loudspeakers 2217 and microphone 2280; an I/O interface 2213 that couples to the keyboard 2202, mouse 2203, scanner 2226, camera 2227 and optionally a joystick or other human interface device (not illustrated); and an interface 2208 for the external modem 2216 and printer 2215. In some implementations, the modem 2216 may be incorporated within the computer module 2201, for example within the interface 2208. The computer module 2201 also has a local network interface 2211, which permits coupling of the computer system 2200 via a connection 2223 to a local-area communications network 2222, known as a Local Area Network (LAN). As illustrated in FIG. 22A, the local communications network 2222 may also couple to the wide network 2220 via a connection 2224, which would typically include a so-called "firewall" device or device of similar functionality. The local network interface 2211 may comprise an Ethernet circuit card, a Bluetooth™ wireless arrangement or an IEEE 802.11 wireless arrangement; however, numerous other types of interfaces may be practiced for the interface 2211.

The I/O interfaces 2208 and 2213 may afford either or both of serial and parallel connectivity, the former typically being implemented according to the Universal Serial Bus (USB) standards and having corresponding USB connectors (not illustrated). Storage devices 2209 are provided and typically include a hard disk drive (HDD) 2210. Other storage devices such as a floppy disk drive and a magnetic tape drive (not illustrated) may also be used. An optical disk drive 2212 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 2200.

The components 2205 to 2213 of the computer module 2201 typically communicate via an interconnected bus 2204 and in a manner that results in a conventional mode of operation of the computer system 2200 known to those in the relevant art. For example, the processor 2205 is coupled to the system bus 2204 using a connection 2218. Likewise, the memory 2206 and optical disk drive 2212 are coupled to the system bus 2204 by connections 2219. Examples of computers on which the described arrangements can be practised include IBM-PC's and compatibles, Sun Sparcstations™, Apple Mac™ or a like computer systems.

The methods of document analysis and generation of a high-level document may be implemented using the computer system 2200 wherein the processes of FIGS. 1 to 21, to be described, may be implemented as one or more software application programs 2233 executable within the computer system 2200. In particular, the steps of the methods of document analysis and generation of a high-level document are effected by instructions 2231 (see FIG. 22B) in the software 2233 that are carried out within the computer system 2200. The software instructions 2231 may be formed as one or more code modules, each for performing one or more particular tasks. The software may also be divided into two separate parts, in which a first part and the corresponding code modules performs the document analysis and high-level document generation methods, and a second part and the corresponding code modules manage a user interface between the first part and the user.

The software may be stored in a computer readable medium, including the storage devices described below, for example. The software is loaded into the computer system 2200 from the computer readable medium, and then executed by the computer system 2200. A computer readable medium having such software or computer program recorded on the computer readable medium is a computer program product. The use of the computer program product in the computer system 2200 preferably effects an advantageous apparatus for document analysis and generation of a high-level document.

The software 2233 is typically stored in the HDD 2210 or the memory 2206. The software is loaded into the computer system 2200 from a computer readable medium, and executed by the computer system 2200. Thus, for example, the software 2233 may be stored on an optically readable disk storage medium (e.g., CD-ROM) 2225 that is read by the optical disk drive 2212. A computer readable medium having such software or computer program recorded on it is a computer program product. The use of the computer program product in the computer system 2200 preferably effects an apparatus for document analysis and generation of a high-level document.

In some instances, the application programs 2233 may be supplied to the user encoded on one or more CD-ROMs 2225 and read via the corresponding drive 2212, or alternatively may be read by the user from the networks 2220 or 2222. Still further, the software can also be loaded into the computer system 2200 from other computer readable media. Computer readable storage media refers to any non-transitory tangible storage medium that provides recorded instructions and/or data to the computer system 2200 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 2201. Examples of transitory or non-tangible computer readable transmission media that may also participate in the provision of software, application programs, instructions and/or data to the computer module 2201 include radio or infra-red transmission channels as well as a network connection to another computer or networked device, and the Internet or Intranets including e-mail transmissions and information recorded on Websites and the like.

The second part of the application programs 2233 and the corresponding code modules mentioned above may be executed to implement one or more graphical user interfaces (GUIs) to be rendered or otherwise represented upon the display 2214. Through manipulation of typically the keyboard 2202 and the mouse 2203, a user of the computer system 2200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 2217 and user voice commands input via the microphone 2280.

FIG. 22B is a detailed schematic block diagram of the processor 2205 and a "memory" 2234. The memory 2234 represents a logical aggregation of all the memory modules (including the HDD 2209 and semiconductor memory 2206) that can be accessed by the computer module 2201 in FIG. 22A.

When the computer module 2201 is initially powered up, a power-on self-test (POST) program 2250 executes. The POST program 2250 is typically stored in a ROM 2249 of the semiconductor memory 2206 of FIG. 22A. A hardware device such as the ROM 2249 storing software is sometimes referred to as firmware. The POST program 2250 examines hardware within the computer module 2201 to ensure proper functioning and typically checks the processor 2205, the memory 2234 (2209, 2206), and a basic input-output systems software (BIOS) module 2251, also typically stored in the ROM 2249, for correct operation. Once the POST program 2250 has run successfully, the BIOS 2251 activates the hard disk drive 2210 of FIG. 22A. Activation of the hard disk drive 2210 causes a bootstrap loader program 2252 that is resident on the hard disk drive 2210 to execute via the processor 2205. This loads an operating system 2253 into the RAM memory 2206, upon which the operating system 2253 commences operation. The operating system 2253 is a system level application, executable by the processor 2205, to fulfil various high level functions, including processor management, memory management, device management, storage management, software application interface, and generic user interface.

The operating system 2253 manages the memory 2234 (2209, 2206) to ensure that each process or application running on the computer module 2201 has sufficient memory in which to execute without colliding with memory allocated to another process. Furthermore, the different types of memory available in the system 2200 of FIG. 22A must be used properly so that each process can run effectively. Accordingly, the aggregated memory 2234 is not intended to illustrate how particular segments of memory are allocated (unless otherwise stated), but rather to provide a general view of the memory accessible by the computer system 2200 and how such is used.

As shown in FIG. 22B, the processor 2205 includes a number of functional modules including a control unit 2239, an arithmetic logic unit (ALU) 2240, and a local or internal memory 2248, sometimes called a cache memory. The cache memory 2248 typically includes a number of storage registers 2244-2246 in a register section. One or more internal busses 2241 functionally interconnect these functional modules. The processor 2205 typically also has one or more interfaces 2242 for communicating with external devices via the system bus 2204, using a connection 2218. The memory 2234 is coupled to the bus 2204 using a connection 2219.

The application program 2233 includes a sequence of instructions 2231 that may include conditional branch and loop instructions. The program 2233 may also include data 2232 which is used in execution of the program 2233. The instructions 2231 and the data 2232 are stored in memory locations 2228, 2229, 2230 and 2235, 2236, 2237, respectively. Depending upon the relative size of the instructions 2231 and the memory locations 2228-2230, a particular instruction may be stored in a single memory location as depicted by the instruction shown in the memory location 2230. Alternately, an instruction may be segmented into a number of parts each of which is stored in a separate memory location, as depicted by the instruction segments shown in the memory locations 2228 and 2229.

In general, the processor 2205 is given a set of instructions which are executed therein. The processor 1105 waits for a subsequent input, to which the processor 2205 reacts to by executing another set of instructions. Each input may be provided from one or more of a number of sources, including data generated by one or more of the input devices 2202, 2203, data received from an external source across one of the networks 2220, 2202, data retrieved from one of the storage devices 2206, 2209 or data retrieved from a storage medium 2225 inserted into the corresponding reader 2212, all depicted in FIG. 22A. The execution of a set of the instructions may in some cases result in output of data. Execution may also involve storing data or variables to the memory 2234.

The disclosed document analysis and high-level document generation arrangements use input variables 2254, which are stored in the memory 2234 in corresponding memory locations 2255, 2256, 2257. The arrangements produce output variables 2261, which are stored in the memory 2234 in corresponding memory locations 2262, 2263, 2264. Intermediate variables 2258 may be stored in memory locations 2259, 2260, 2266 and 2267.

Referring to the processor 2205 of FIG. 22B, the registers 2244, 2245, 2246, the arithmetic logic unit (ALU) 2240, and the control unit 2239 work together to perform sequences of micro-operations needed to perform "fetch, decode, and execute" cycles for every instruction in the instruction set making up the program 2233. Each fetch, decode, and execute cycle comprises:

(a) a fetch operation, which fetches or reads an instruction 2231 from a memory location 2228, 2229, 2230;

(b) a decode operation in which the control unit 2239 determines which instruction has been fetched; and (c) an execute operation in which the control unit 2239 and/or the ALU 2240 execute the instruction.

Thereafter, a further fetch, decode, and execute cycle for the next instruction may be executed. Similarly, a store cycle may be performed by which the control unit 2239 stores or writes a value to a memory location 2232.

Each step or sub-process in the processes of FIGS. 1 to 21 is associated with one or more segments of the program 2233 and is performed by the register section 2244, 2245, 2247, the ALU 2240, and the control unit 2239 in the processor 2205 working together to perform the fetch, decode, and execute cycles for every instruction in the instruction set for the noted segments of the program 2233.

The method of document analysis and generation of a high-level document may alternatively be implemented in dedicated hardware such as one or more integrated circuits performing the functions or sub functions of document analysis and high-level document generation. Such dedicated hardware may include graphic processors, digital signal processors, or one or more microprocessors and associated memories. Notably the arrangement of FIG. 1 may be implemented using the computer system 2200 of FIGS. 22A and 22B where the processing of colour quantisation 150, page layout analysis 160, production of the page logical structure 165, object fill colour analysis 170 and output conversion 180, are performed in software as the application program 2233 stored and executable by the computer module 2201.

Figure 2:
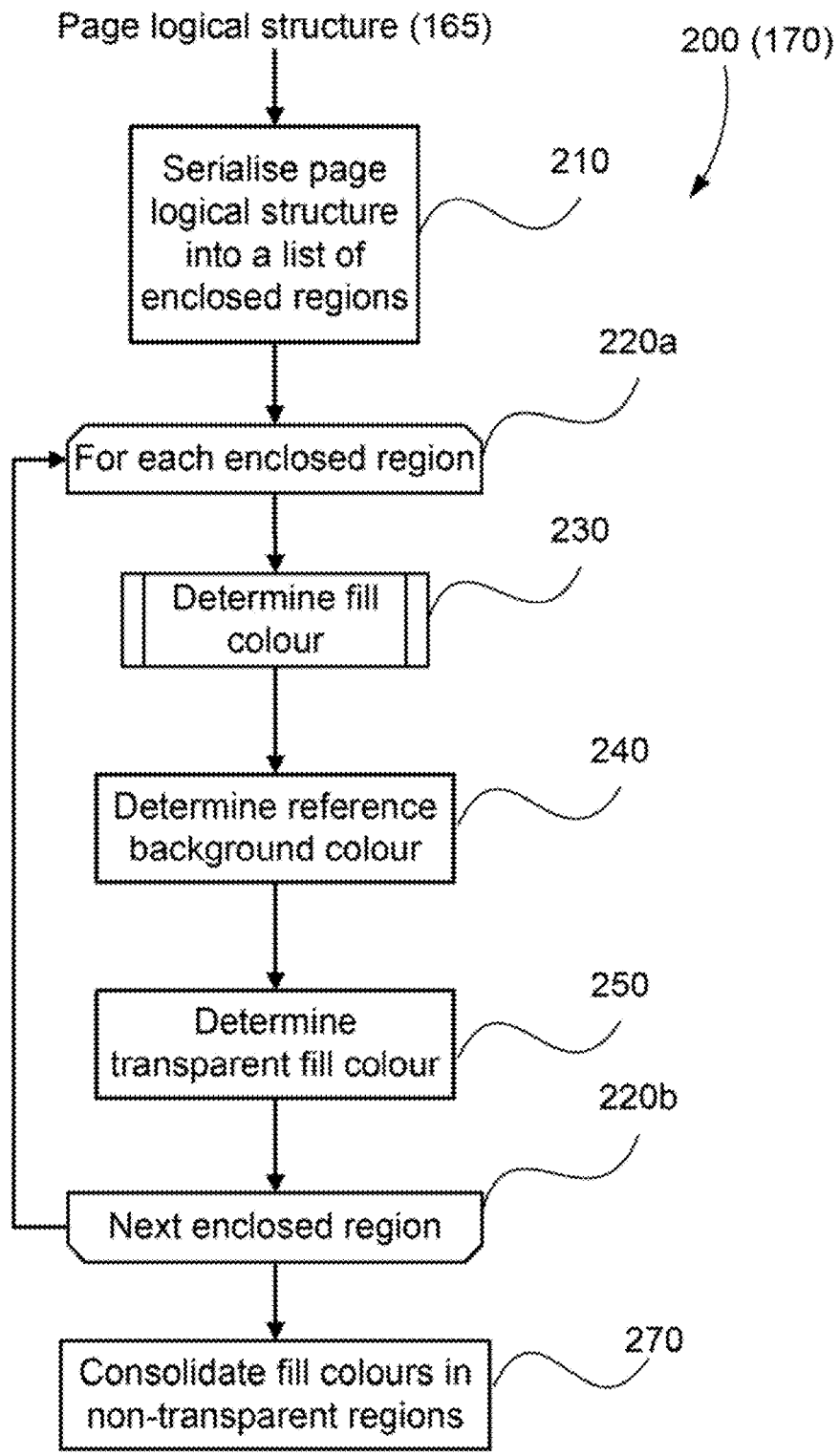
FIG. 2 is a schematic flow diagram illustrating a method of non-text object fill colour analysis based on identified page logical structure.

FIG. 2 illustrates a method 200 of object fill colour analysis, as can be implemented in the object fill colour analysis module 170 of the scan-to-high-level-document system 100 and receives as input the page logical structure 165. The method 200 has a region serialising step 210, a region iteration step 220, a fill colour determining step 230, a reference background colour determining step 240, a transparent colour determining step 250 and a colour consolidation step 270.

In the region serialising step 210, the processor 2205 reads in the page logical structure 165 from storage in the memory 2206, 2210. The structure 165 is a tree of enclosed regions, and places each enclosed region into a list in a breadth first fashion, wherein the traversal of nodes only moves down to the next level of the tree hierarchy when the current level is exhausted. The region iteration step 220 iterates over all enclosed regions in the list of enclosed regions, one at a time. During each iteration of the enclosed region loop from region step 220a to next region step 220b, a fill colour or transparent fill is determined for the current enclosed region. The fill colour determining step 230 will be further explained in FIG. 7. The reference background colour determining step 240 assigns a reference background colour to the current enclosed region based on an estimated page background colour. One implementation uses the most dominant colour on the page as the estimated page background colour. The most dominant colour is selected based on the number of pixels of the region so the colour of the region with the most pixels becomes the dominant colour. Another implementation may use the fill colour of a fully enclosing region as the estimated page background colour. A fully enclosing region can be located using the object relationships from the page logical structure 165. The transparent colour determining step 250 compares the fill colour of the current enclosed region with the reference background colour of the region. If the colour difference between the fill colour of the current enclosed region and the reference background colour of the region is small, the current enclosed region is assigned with a transparent colour. If the current enclosed region does not have a fill colour or a reference background colour, no colour comparison is performed. Once all enclosed regions are processed in the enclosed region loop, the colour consolidation step 270 consolidates fill colours in non-transparent enclosed regions. Similar fill colours in non-transparent enclosed regions are made identical to remove colour discrepancy caused by the printing process.

Returning to FIG. 4A, the example will now be used to further explain the reference background colour determining step 240 and the transparent colour determining step 250. Enclosed region 410 is selected as the most dominant colour because it has the largest number of pixels. In one implementation, the fill colour of enclosed region 410 is used as an estimated page colour and the estimated page colour is used as the reference background colour for every enclosed region. In another implementation, the reference background colour for an enclosed region is determined according to a colour of a region that encloses the enclosed region. Enclosed region 440 has a fully enclosing region 425, which has a fully enclosing region 410. Enclosed region 435 does not have a fully enclosing region. Enclosed region 415 is the fully enclosing region of enclosed region 450, 455, 460 and 465. An enclosed region can only have none or one fully enclosing region. Fill colour of enclosed region 425 is used as the reference background colour for enclosed region 440 and fill colour of enclosed region 415 is used as the reference background colour for enclosed regions 450, 455, 460 and 465. In this implementation the colour is selected from a parent enclosing region. If the estimated page colour is used as the reference background colour for all enclosed regions, only enclosed region 420 is assigned with a transparent colour. If the fill colour of a fully enclosing parent region is used as the reference background colour, enclosed region 440, 420, 465 and 455 is assigned with a transparent colour.

FIG. 7A-7C further explains how to determine a fill colour for an enclosed region. FIG. 7C is a flowchart of determining a fill colour for an enclosed region of step 230. FIG. 7A and FIG. 7B are two examples of an enclosed region being divided into tiles by an enclosed region dividing step 710 of FIG. 7C. FIG. 7A is an oval-shaped enclosed region being divided into 8 tiles while FIG. 7B is a table cell with text content with an enclosed region that has been divided into 6 tiles. The rectangular region inside the cell, indicated by the dotted lines, is an exclusion region for text content. An exclusion region, as seen in FIG. 7B, can be used to exclude source colours which would be sourced from text content AB. In a one implementation, the tile size is 32×32 pixels for a 300 dpi input. A current enclosed region simply defines a boundary for source colour gathering. The source colours for the current enclosed region may come from the original scanned image or a colour quantised image produced by the colour quantisation module 150 in the scan-to-high-level-document system 100. The tile (for-next) loop 720 iterates over all tiles of the current enclosed region. During each iteration of the tile loop from tile step 720a to next tile step 720b, a dominant colour determining step 730 is executed for the current tile to find dominant colours from the source colours. Colour clustering or colour histogram techniques can be used to find dominant colours. For each tile, a maximum of four dominant colours may be sufficient. The dominant colours and the number of pixels for each dominant colour for the current tile are added to a dominant colour list in step 740. Step 750 forms a colour histogram based on the dominant colour list produced by the tile loop 720. Finally step 760 examines the colour histogram to make a fill colour selection. If the colour variation in the colour histogram is small, the colour from a most populated bin of the histogram is chosen as the fill colour for the current region. If the colour variation observed from the colour histogram is large, the enclosed region may contain a gradation fill and no fill colour is assigned.

Alternatively, the fill colour for an enclosed region may be estimated based on the set of colour regions produced by the colour quantisation process 150 that are both adjacent to and enclosed by the region. Such enclosed regions are referred to as enclosed colour regions. Each enclosed colour region is assumed to have a colour set according to some kind of average over pixels in the region, or averaged over a set of related regions. The enclosed colour regions are clustered such that each cluster includes only enclosed colour regions of a similar colour according to a suitable colour distance metric. A suitable metric can be defined in terms of an LAB colour difference $\Delta_{LAB}$ between two colours $(l_1, a_1, b_1)$ and $(l_2, a_2, b_2)$, given by:

$$\Delta_{LAB}=SQRT(0.1)((l_1-l_2)^2+(a_1-a_2)^2+(b_1-b_2)^2)$$

Two colours might be defined as similar if the colour difference is less than a threshold value (e.g. $\Delta_{LAB}<5$). Alternatively, the threshold may be selected based on the confidence of each enclosed colour region colour estimate. Typically the confidence would be lower if the enclosed colour region has a large ratio of edge pixels to pixel count and higher if it has a low ratio of edge pixels to total pixel count. If the largest edge ratio of the two objects being compared is less than 0.1, then the colours might be considered similar if $\Delta_{LAB}<2$, if it is less than 0.25 then the colours might be considered similar if $\Delta_{LAB}<5$, otherwise they are considered similar if $\Delta_{LAB}<10$.

The average colour of each clustered set of enclosed colour regions is calculated as a weighted sum over the set where the area of each enclosed colour region defines the weighting, and statistics of the sum of the area and the length of adjacency over the set of regions are also accumulated for each cluster. This processing may be achieved based on the adjacency of enclosed colour regions and their approximate geometry. If there is only one cluster of enclosed colour regions then the colour can be estimated based on the average colour of this cluster. If there are multiple colour clusters, and one of the clusters is dominant then this cluster can define the enclosed region colour estimate (e.g. a dominant cluster might constitutes 70% of the total area in the set of colour clusters and 20% of the perimeter length). Otherwise, no colour estimate can be formed for the region.

Figure 10:
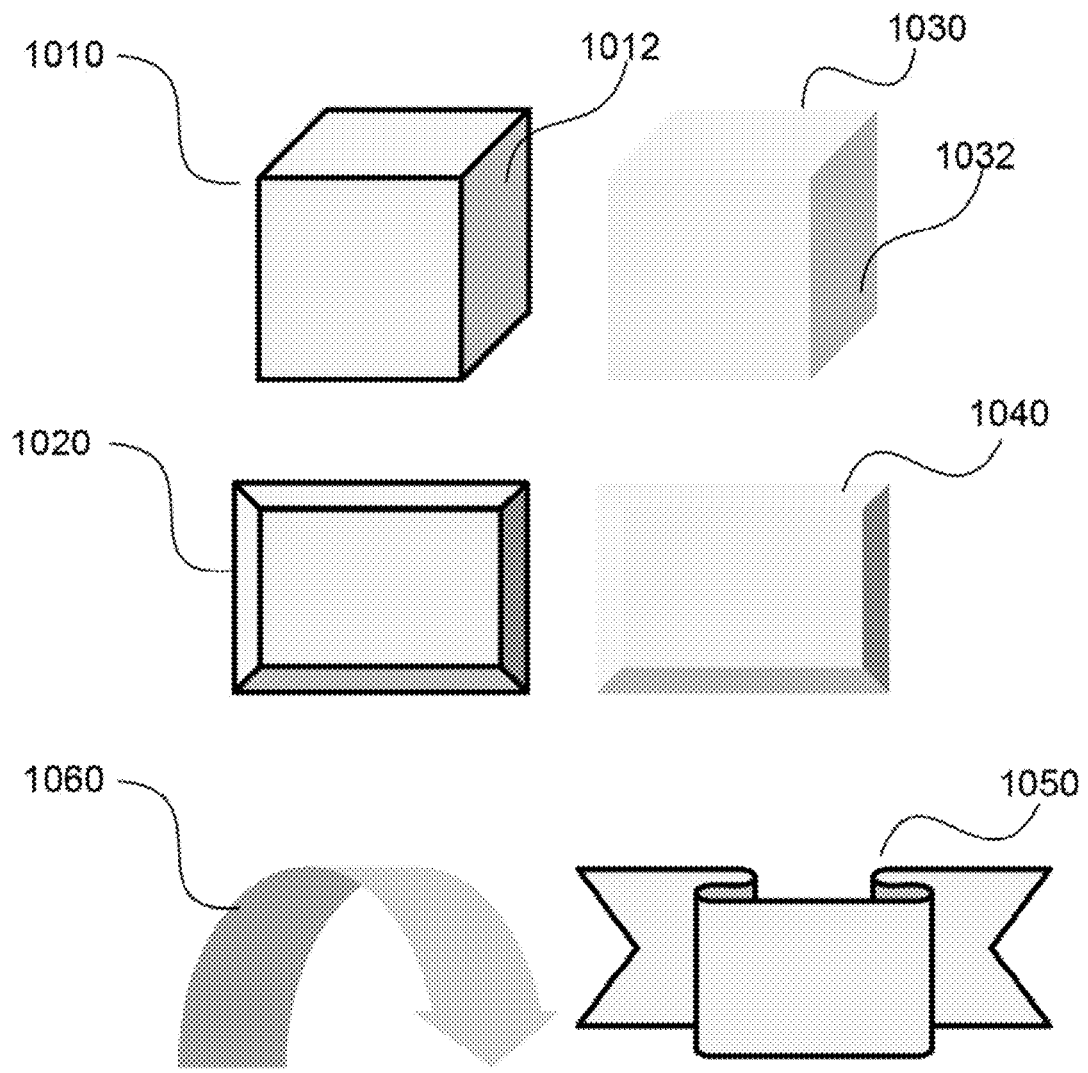
FIG. 10 is an example of geometric entities such as template shapes commonly used in Microsoft PowerPoint.

Some geometric entities, such as template shapes commonly used in Microsoft Word™ or PowerPoint™, are defined with multiple interior regions that have slightly different colours. For example, FIG. 10 illustrates example objects including two cubes 1010 and 1030, a curved arrow 1060, bevels 1020 and 1040, and scroll 1050, each having a defined fill colour. However some of the interior regions have a "shadow" fill colour based on the main fill colour modified such that the luminance is lower. The shadow fill colours can be seen in regions (e.g. 1012, 1032) of the cubes 1010, 1030 that represent different faces. Such fill colours can be handled by processing the set of all enclosed colour regions together and checking whether there are two distinct colour clusters associated with a lighter and a darker shade of the same colour. Further geometric tests may also be performed to make sure that the geometry of the shaded regions matches an expected geometry of the template shape, however the template shape formed from the regions must first be identified. The geometric tests may be based on simple statistics such as areas, or more detailed checks of the arrangement of the various enclosed regions.

Figure 3:
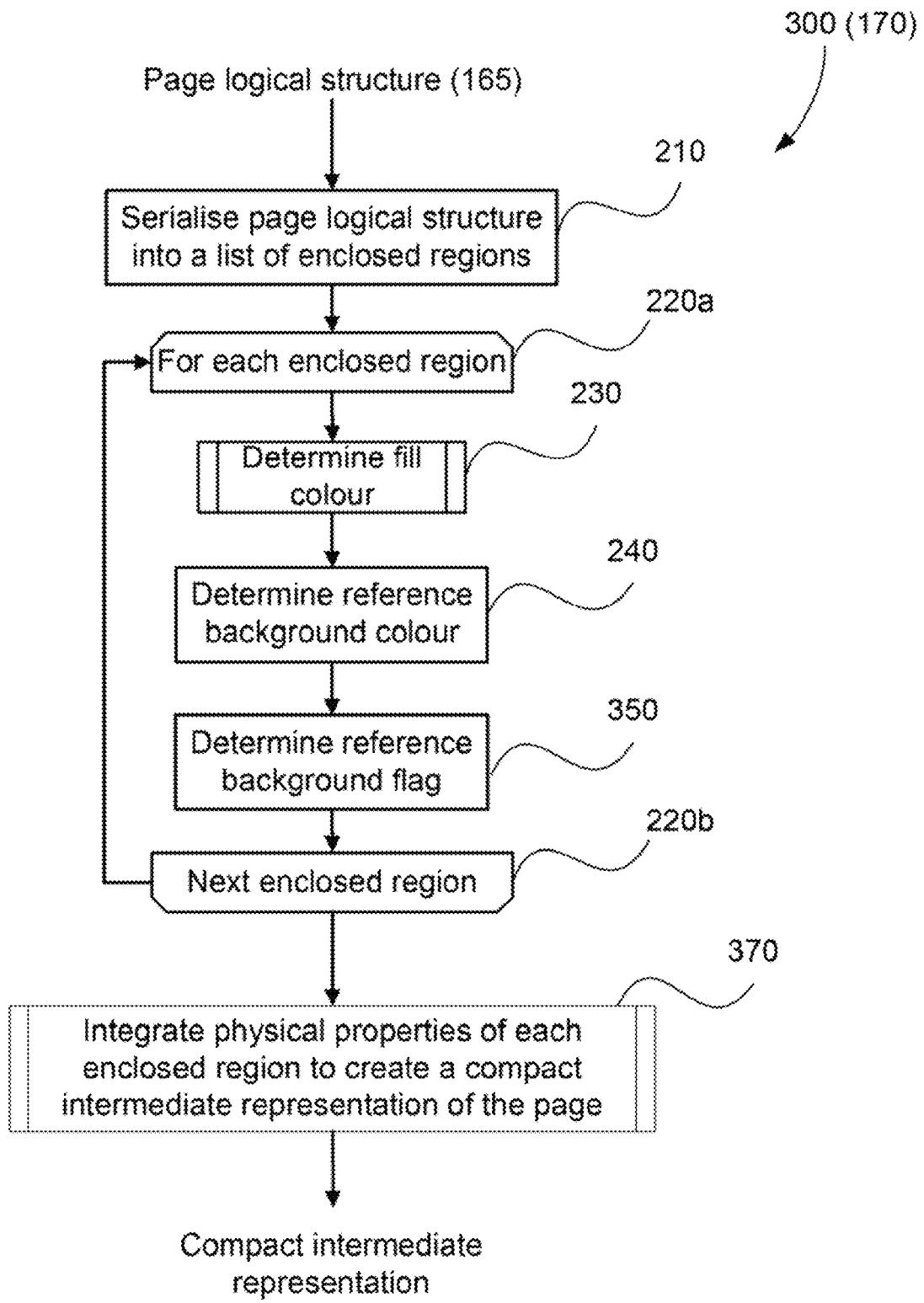
FIG. 3 is a schematic flow diagram illustrating a method of non-text object fill colour analysis based on identified page logical structure.

FIG. 3 illustrates a method 300 of object fill colour analysis used in an alternative implementation to that of FIG. 2, as can be implemented in the object fill colour analysis module 170 of the scan-to-high-level-document system 100. Again the method 300 can be implemented in software and has a region serialising step 210, an enclosed region iteration step 220, a fill colour determining step 230, a reference background colour determining step 240, a reference background flag determining step 350, and an output step 370.

Method 300 is similar to method 200 except that a transparent fill decision is not bound directly to each object. Steps 210-240 are identical to the steps described in relation to method 200. A first difference to the method 200 occurs with the reference background flag determining step 350 which compares a fill colour of the current enclosed region with a corresponding reference background colour for the region. If the colour difference between the fill colour and reference background colour of the current enclosed region is small, the current enclosed region is assigned a reference background flag and the fill colour is replaced by the reference background colour. If the current enclosed region does not have a fill colour or a reference background colour, no colour comparison is performed and no reference background flag is assigned. Once all enclosed regions are processed, the output step 370 creates a compact intermediate representation for dynamic output format applications.

Figure 8:
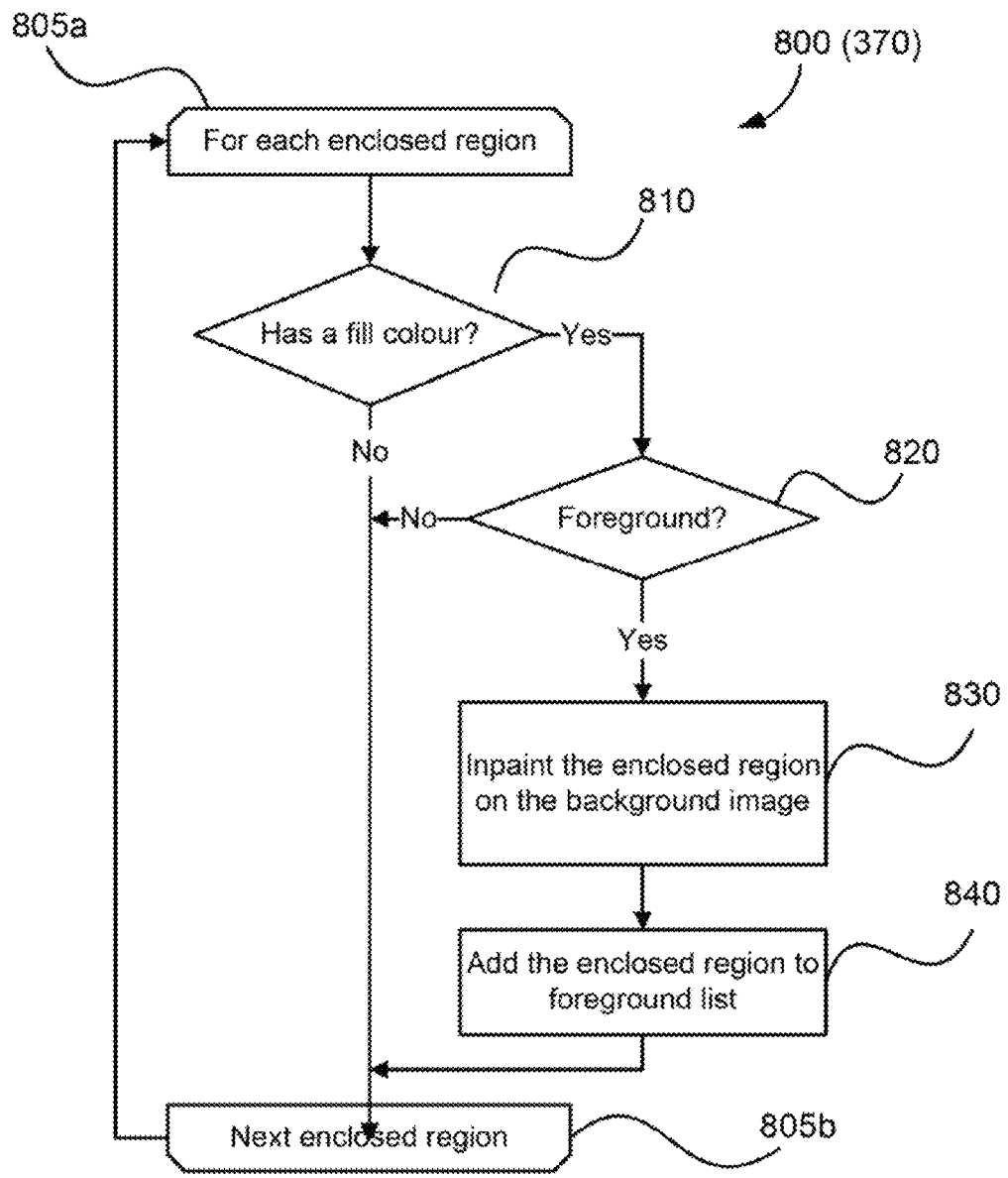
FIG. 8 is a schematic flow diagram illustrating a method of creating a compact intermediate representation for output format applications.

FIG. 8 illustrates a method 800 of how a compact intermediate representation for a page is generated according to the output step 370 of FIG. 3. Method 800 has a region iteration loop from region iteration step 805*a* to a next enclosing region selection step 805*b*, a fill colour test step 810, a foreground test step 820, an in-painting step 830 and a foreground creation step 840. The enclosed region (for-next) loop from 805*a* to 805*b* iterates over all enclosed regions to construct a representation for each enclosed region, each enclosed region being represented either in the background or foreground. At the start of the method 800, the background contains the entire original document image while the foreground is an empty list. The fill colour test step 810 checks if the current enclosed region has a fill colour. If a fill colour exists, the enclosed region is tested to determine if the region should be assigned to the foreground in step 820. If the region does not have a fill colour, the region is probably a gradation or a photograph and the region remains as part of the background. The foreground test step 820 is based on a size of the region and a cost of representation in the background and foreground in terms of storage size. If the region is a recognised content type, such as template shape, text, table and lines, or can be represented effectively by vectors, the region is classified as foreground. The area in the background that is occluded by the foreground classified region is in-painted in the in-painting step 830. The in-painting step removes any visual presence of the current enclosed region from the background. The enclosed region is then added to the foreground list in step 840. After all enclosed regions are analysed, a background image and a list of foreground regions form a compact intermediate representation for the page which is ready for a variety of dynamic output format applications.

Figure 9A:
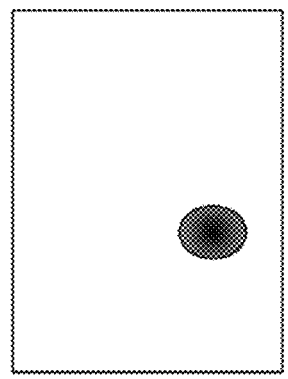
FIG. 9A is an example of a background image of the compact intermediate representation for a page.
Figure 9B:
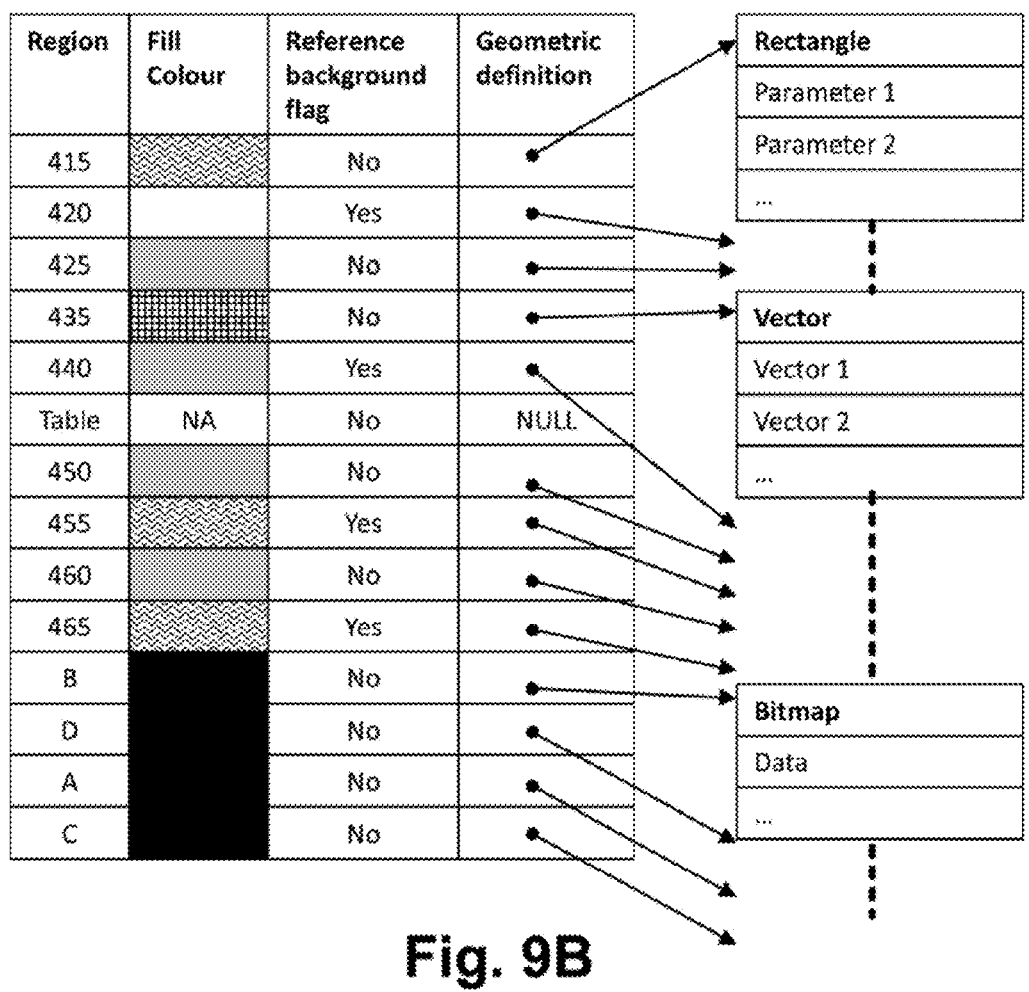
FIG. 9B is an example of foreground enclosed regions of the compact intermediate representation for a page.

FIG. 9A shows an example of a background image produced from the input example in FIG. 4 using one implementation according to the present disclosure, while FIG. 9B shows a corresponding foreground list produced from the input example in FIG. 4. Each record in the foreground list defines how a foreground region can be configured for a dynamic output application and details the fill colour, reference background flag and geometric definition for each object. A geometric definition for an enclosed foreground region can be a shape definition, a list of vectors or a bitmap. The geometric definition in the foreground list is a reference to a memory starting with a header that defines the type of geometric definition and a variable size of data. The size of data depends on the shape type, area of the enclosed region and contour geometry.

Figure 5:
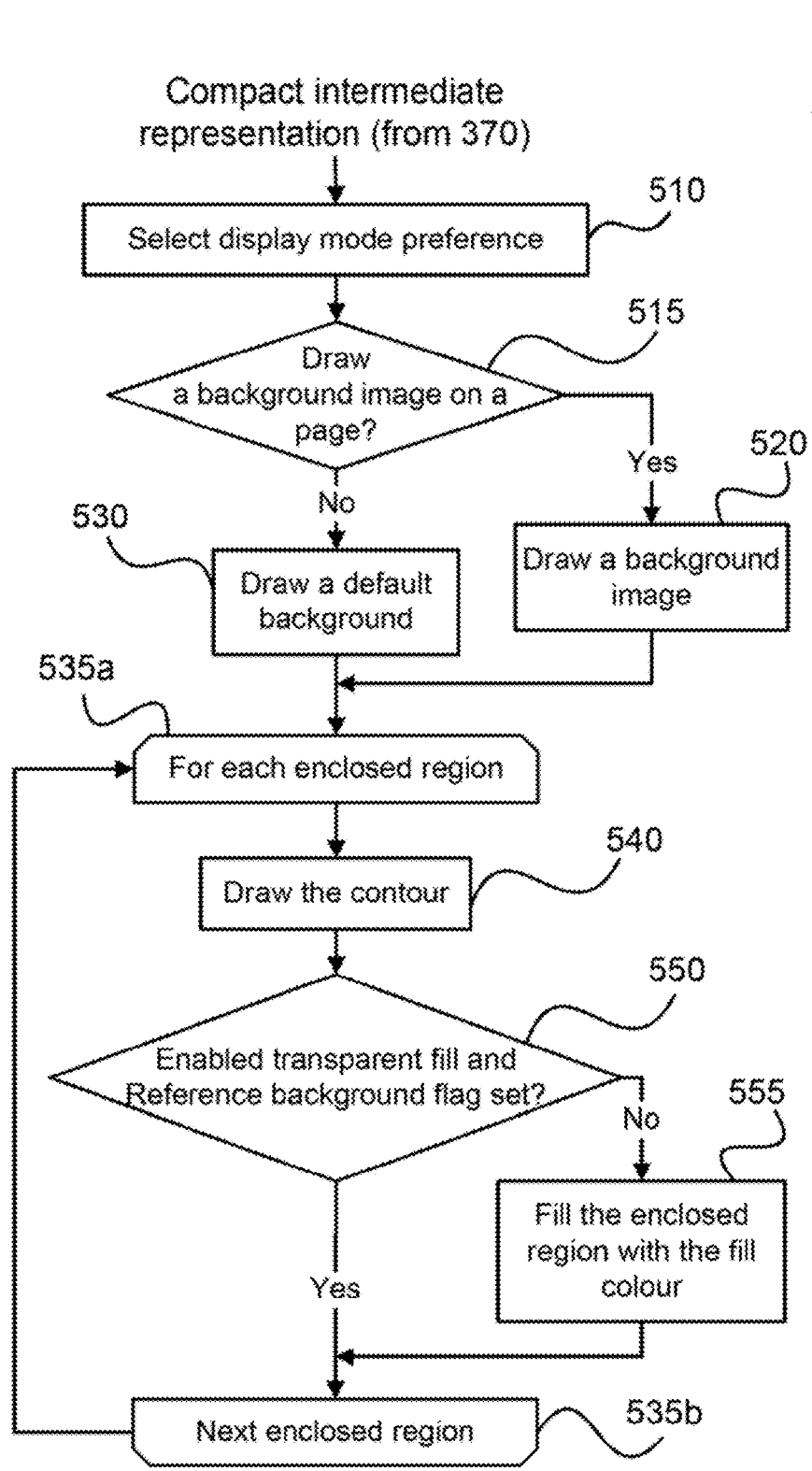
FIG. 5 is a schematic flow diagram illustrating a method of dynamically displaying a document based on the output from FIG. 2.
Figure 6:
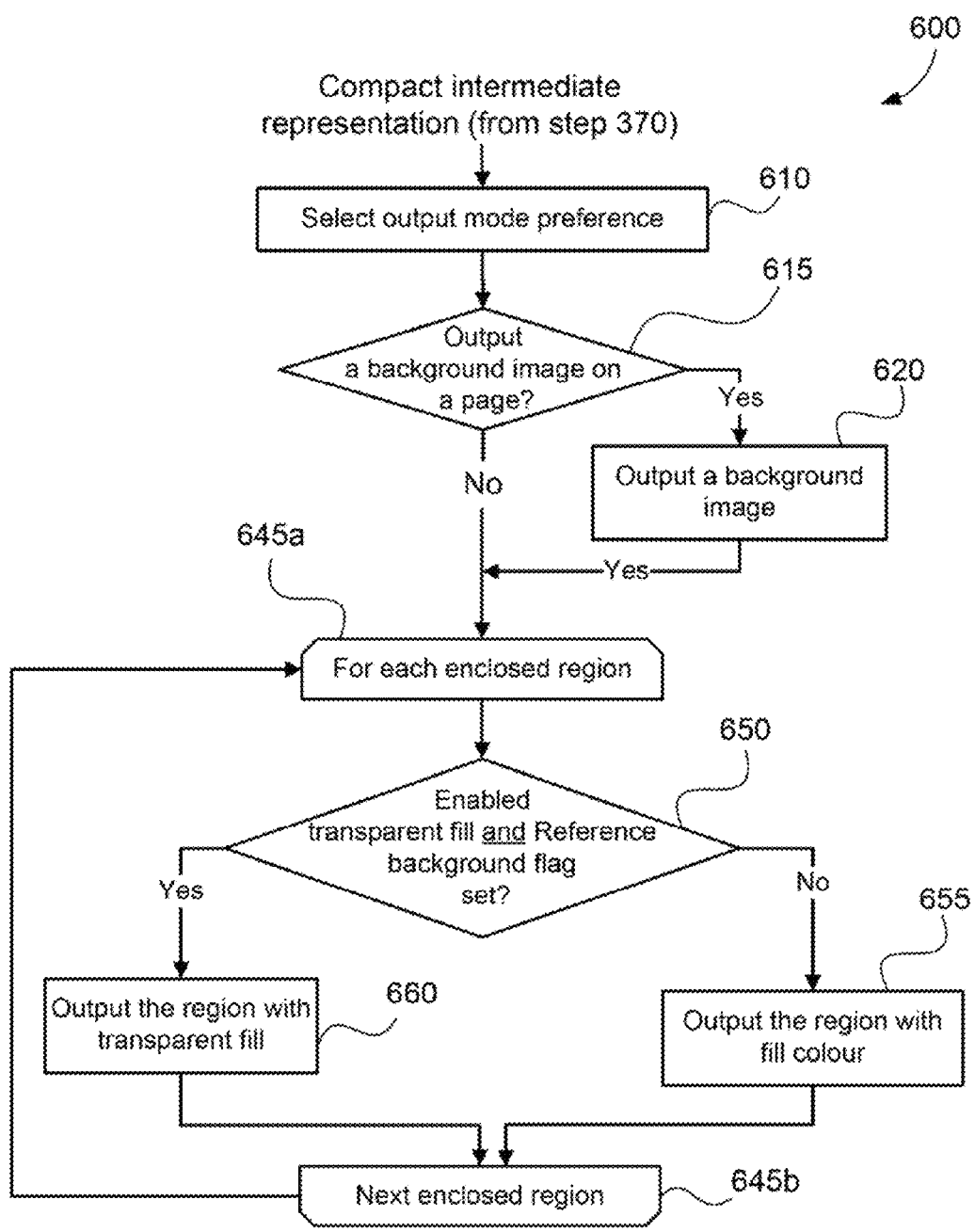
FIG. 6 is a schematic flow diagram illustrating a method of dynamically outputting a document to a different format based on the output from FIG. 2.

Two examples of a dynamic output format application are provided in FIG. 5 and FIG. 6. Method 500 is a dynamic display application using the compact intermediate representation generated by step 370. The method 500 is preferably implemented in software and allows switching between one of four display modes dependent on background image data using a common data representation format for a page. The four display modes are:

1. Using a background image as the backdrop with non-transparent fill colours for all foreground regions;
2. Using a background image as the backdrop with transparent fill colours for some foreground regions;
3. Using a default background as the backdrop with non-transparent fill colours for all foreground regions; and
4. Using a default background as the backdrop with transparent fill colours for some foreground regions.

An initial preference selection step 510 selects one of the above four display modes and the selection then controls the process of how the compact intermediate representation is configured, as shown in the Table 1 below, to display the page.

TABLE 1

|  |  | Display mode | | | |
|---|---|---|---|---|---|
|  |  | 1 | 2 | 3 | 4 |
| Process configuration | Draw a background image | Yes | Yes | No | No |
|  | Enable transparent fill | No | Yes | No | Yes |

Step 515 then tests if the "draw a background image" configuration is enabled. If "draw a background image" configuration is enabled, the method 500 proceeds to step 520 to draw the background image as the backdrop for the page, thereby displaying the background on the computer display 2214 in a manner akin to the representation 190 of FIG. 1. Otherwise the process proceeds to step 530 to draw and display a default background as the backdrop for the page. For example, the default background may be a white canvas. The method 500 then starts a region iteration loop from region iteration step 535*a* to a next enclosed region step 535*b* to draw all foreground regions on the page according to the setting of "enable transparent fill" and reference background flag. Step 540 draws and displays a contour of the current enclosed region on the canvas, such being reproduced on the display screen 2214. Step 550 checks if both "enable transparent fill" and reference background flag are set. If they are both set, then no further processing of the region is required and the method 500 proceeds to a next region. Otherwise the method 500 proceeds to step 555 to fill the enclosed region with the fill colour of the current enclosed region, which is displayed on the display 2214. The method 500 continues until all enclosed regions are processed. With this approach the electronic document is displayed in one of a plurality of modes based on a selection to draw the background image, in which the transparent fill is controlled by the selection.

In one alternative implementation, the preference selection 510 is only based on whether a background image is output or not. If the preference selection is to have a background image, "enable transparent fill" is enabled by default. Step 550 only needs to check whether reference background flag is set or not. If the preference selection 510 is not to have a background image, "enable transparent fill" is disabled. In this example, step 540 proceeds directly to step 555 bypassing step 550 completely.

A method 600 of FIG. 6 describes a dynamic output format application using the compact intermediate representation described above. The method 600 allows switching between one of four output formats dependent on background image data using a common data representation format for a page. The four output formats are:

1. Including a background image with non-transparent fill colours for all foreground regions;
2. Including a background image with transparent fill colours for some foreground regions;
3. No background image with non-transparent fill colours for all foreground regions; and
4. No background image with transparent fill colours for some foreground regions A preference selection step 610 selects one of the above four output formats and the selection then controls how the compact intermediate representation is configured, as shown in Table 2 below, to generate an output for the page.

TABLE 2

|  |  | Output mode | | | |
|---|---|---|---|---|---|
|  |  | 1 | 2 | 3 | 4 |
| Process configuration | Output a background image | Yes | Yes | No | No |
|  | Enable transparent fill | No | Yes | No | Yes |

Step 615 tests if "output a background image" configuration is enabled. If the "output a background image" configuration is enabled, the method 600 proceeds to step 620 to output the background image. Otherwise the method 600 commences a region iteration loop from a region iteration step 645*a* to a next enclosed region step 645*b* to output all foreground regions according to the setting of "enable transparent fill" and reference background flag. A first step inside the region iteration loop is step 650 which checks if both "enable transparent fill" and reference background flag are set. If both flags are set, the method 600 proceeds to an output region with transparent fill step 660 to set the region with a transparent colour and output the region. Otherwise the method 600 proceeds to an output region with fill colour step 655 to set the region with a non-transparent fill colour and output the region. The region iteration loop continues until all enclosed regions are processed.

In one alternative implementation, the preference selection 610 is only based on whether a background image is output or not. If the preference selection is to have a background image, "enable transparent fill" is enabled. Step 650 only needs to check whether reference background flag is set or not. If the preference selection 610 is not to have a background image, "enable transparent fill" is disabled. In this implementation, only step 655 is performed inside the region iteration loop from a region iteration step 645*a* to a next enclosed region step 645*b*.

Advantage

The scan-to-high-level-document system 100, described above, provides an output with enclosed regions that have a transparent fill. The use of a transparent fills allows a background colour of the enclosed region to be seen through the enclosed region. In particular, when applied to a table with many cells, the scan-to-high-level-document system may apply a transparent fill to some of the table cells while outputting a fill colour in other cells. The ability to provide a table with some of the cells being transparent allows a table being interpreted correctly in the converted high level document output when the original was printed on a yellowish recycled paper or a coloured paper. This approach also allows for a table that can be moved from one background to another with the colour of the transparent cells reflecting the change in background colour.

Segmentation of Gradation Regions Using Region Splitting

The following section describes a method of segmenting gradation regions from colour document images. The method is capable of correctly extracting a gradation region which touches another region having a colour similar to one of the colours of the range of colours of the gradation region. This is achieved using the following major steps. Firstly the image is segmented into regions of similar colour. Secondly, some of the similar colour regions are identified as being ambiguous, in the sense that they may contain pixels which are part of a gradation region and that further they may contain pixels which are part of a separate region neighbouring the gradation region. Thirdly, ambiguous regions are split into smaller regions by extending edges which are likely to be edges of gradation regions. Fourthly, using similar colour regions which are considered unambiguous and using regions obtained by splitting ambiguous regions, region merging is performed to extract gradation regions.

Identification of ambiguous regions and region merging is performed using a pair-wise region merge cost which penalises the extent to which a pair of neighbouring regions fails to be modelled by a plane of best fit for each of the pair of regions. The method of region splitting exploits characteristics of gradation regions. One characteristic is that a similar colour region which includes pixels of a gradation region is likely to be adjacent to two similar colour regions, such that the region and the two adjacent regions have colours which are close and approximately collinear in colour space. Another characteristic is that a similar colour region which includes pixels of a gradation region and pixels of a separate region neighbouring the gradation region is likely to have a boundary with a pair of reflex vertices such that an arm of each of the vertices are approximately collinear. These and additional characteristics and their exploitation in region splitting are explained below.

The method is particularly directed at segmentation of gradation regions from scans of printed document images, where the gradation regions result from linear blends in the electronic version of the document image.

Figure 21:
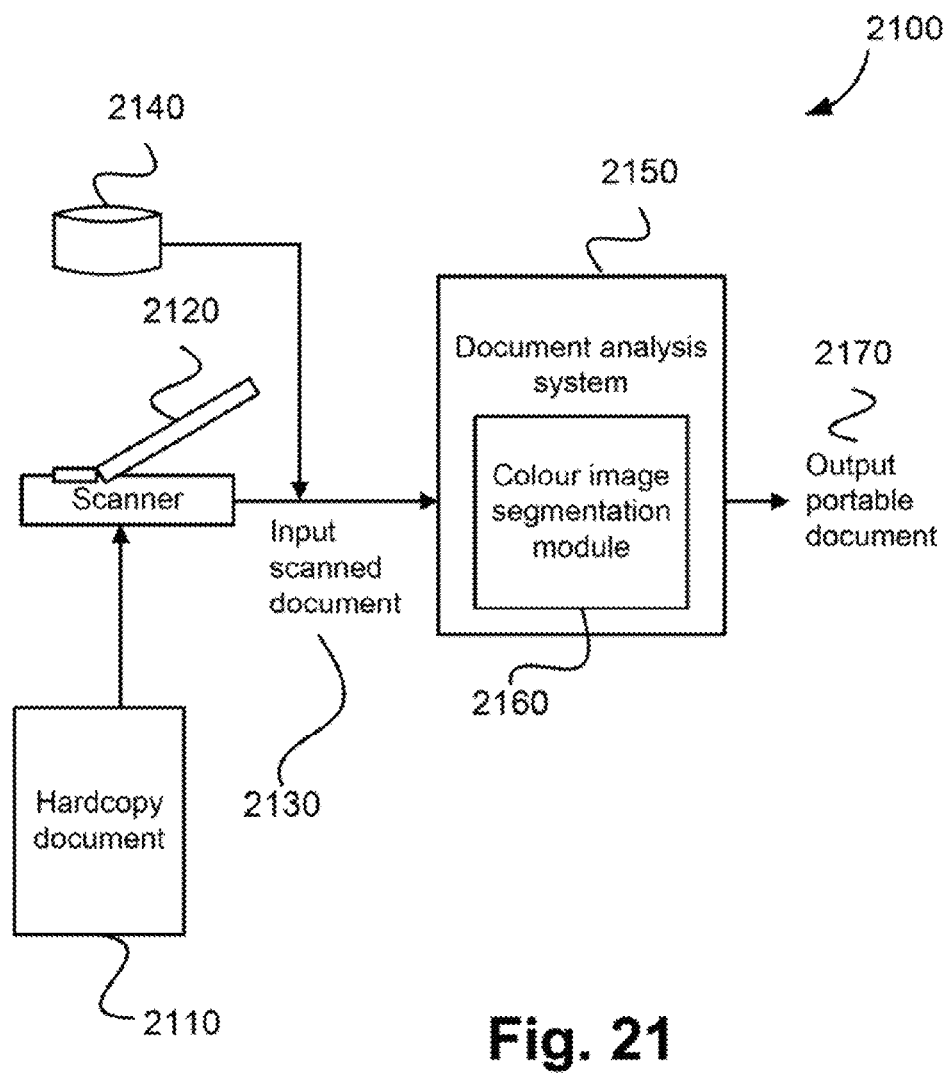
FIG. 21 is a schematic block diagram of a scan to portable document system in which the colour image segmentation method may be practised.

FIG. 21 shows an application environment 2100 of a scan to portable document system. The environment of FIG. 21 is similar to that of FIG. 1 such that the operability of one may be incorporated into the other. A hard copy document 2110 is scanned by a scanner 2120 to form an input scanned document image 2130, which is often simply called the "input document". The source of the input document can also be a digital storage device 2140. The input document 2130 is then sent to a document analysis system 2150 which includes a colour image segmentation module 2160. The document analysis system 2150 accepts an input document 2130 and converts it to a portable file format 2170 for archiving or file exchange. The system 2100 may, like that of FIG. 1, be implemented using the system of FIGS. 22A and 22B, to which the same description applies.

Figure 11:
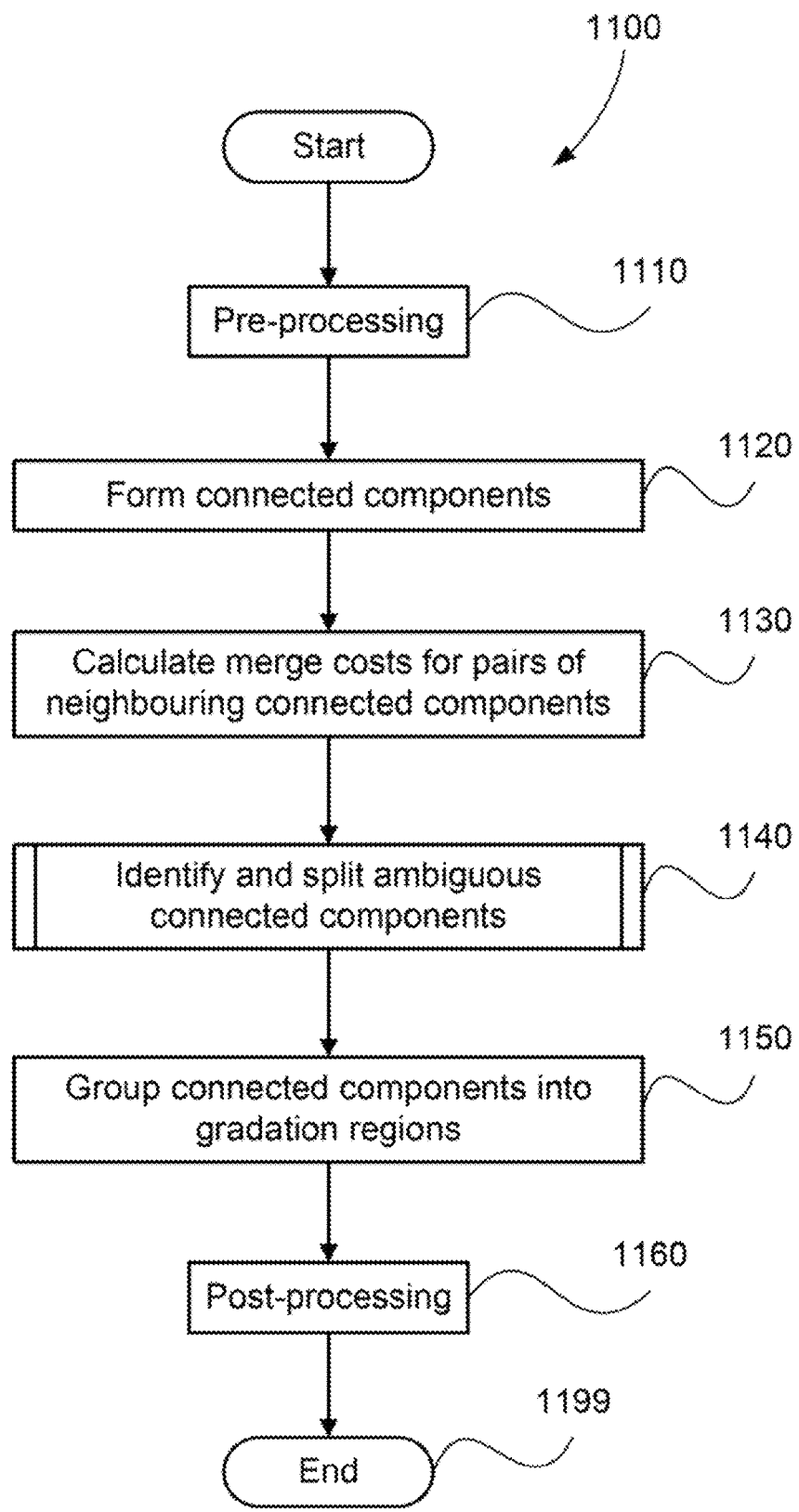
FIG. 11 is a flow diagram describing the high-level processing steps of a colour image segmentation method.

FIG. 11 is a schematic flow diagram showing the high-level processing steps of a colour image segmentation method 1100 which extracts gradation regions from a document image. The colour image segmentation method 1100 is suitable for implementation in module 2160 of the application environment 2100, or implementation in other image processing applications.

In processing step 1110 image pre-processing is performed including noise reduction and de-halftoning. In processing step 1120 the connected components of the image are obtained, each connected component being a connected region of pixels of similar colour. For each connected component a representative colour is determined, which in the following description regarding segmentation of gradation regions is referred to simply as the colour of the connected component. Preferably the connected components are obtained by quantizing the image to a set of colours and assigning the representative colour of each connected component to be a colour of that set of colours, so that, for each pixel within a connected component, a colour distance from the pixel's colour to the connected component colour is at least as small as the colour distance from the pixel's colour to any other colour of the set of colours. Preferably the colour values used for forming connected components are the colour values obtained following noise reduction and de-halftoning. Preferably also processing in steps 1110 and 1120 includes edge sharpening without accentuating colour differences across edges. This can be achieved, for example, following the formation of connected components by combining small or thin connected components at an image edge with neighbouring connected components on the same side of the image edge. When the document image being processed is a scan of a printed image, noise reduction, de-halftoning and edge sharpening are important to allow image segmentation to recover regions of near constant colour which accord with human perception and the likely original electronic representation of the document.

In processing step 1130 a merge cost is calculated between pairs of neighbouring connected components. In this processing step, small connected components are ignored, where a small connected component is a connected component consisting of less than a threshold number of pixels.

The merge cost for merging a pair of neighbouring regions A and B is calculated as follows. Firstly for each colour channel, a plane of best fit is calculated for the colour values of region A and a plane of best fit is calculated for the colour values of region B. Secondly, an estimate is calculated for the error in fitting the colour values of the combined region, formed by the union of regions A and B, using the plane of best fit for region A, and an estimate calculated for the error in fitting the colour values of the same combined region using the plane of best fit for region B. One suitable estimate for the fitting error of a plane to the combined region is simply the maximum absolute value of the difference between the value of any pixel of the combined region and the value at the pixel of the surface obtained by extending the plane. The merge cost is then set to be a colour distance derived from the individual colour component error values. The merge cost for a pair of neighbouring regions penalises dissimilarity of the regions' colours and dissimilarity of the regions' gradients in a single consistent measure.

Figure 15A:
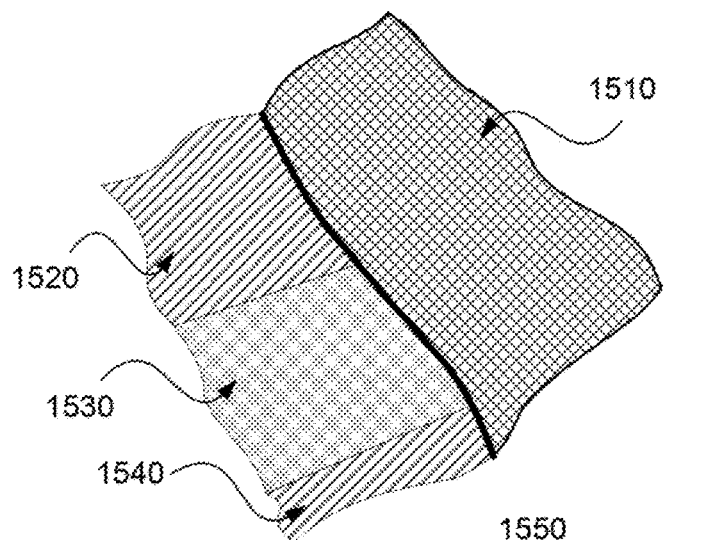
FIGS. 15A, 15B and 15C are representations of part of an image as it undergoes segmentation processing.
Figure 15B:
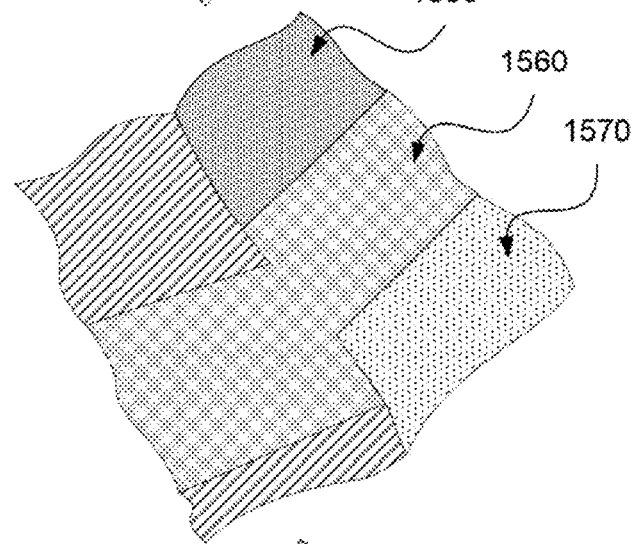
Figure 15C:
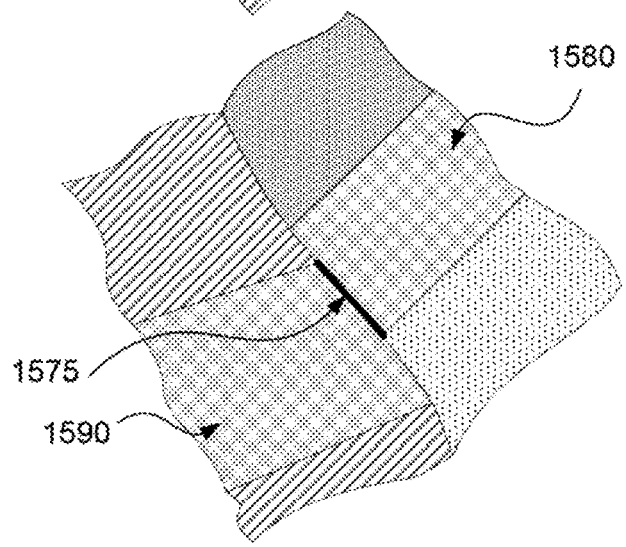

FIGS. 15A, 15B and 15C are used to explain the motivation for the choice of this merge cost and to illustrate the result of the next processing step 1140 which uses the merge cost to identify and subsequently split ambiguous connected components. FIG. 15A shows part of a document image containing a gradation region 1510 overlying three constant colour regions 1520, 1530 and 1540, with region 1530 having a similar colour to part of the gradation region. FIG. 15B shows connected components for the same part of the document image resulting from execution of processing step 1120. Connected components 1550 and 1570 and part of connected component 1560 correspond to the gradation region; connected component 1560 also includes the constant colour region 1530. Connected component 1560 is an ambiguous region. This example illustrates the difficulty in attempting to segment gradation regions using prior art methods which initially perform segmentation into regions of similar colours—attempting to extract gradation regions by simply merging the connected components of FIG. 15B is clearly not possible. Segmentation of gradation regions enables extraction of gradation regions by splitting ambiguous connected components such as connected component 1560. FIG. 15C shows the result of processing step 1140—ambiguous connected component 1560 has been split using the line segment 1575 into the split connected components 1580 and 1590.

We now explain the design of the merge cost using FIGS. 15B and 15C. Considering FIG. 15B and the merge cost for merging connected component 1560 with either of the neighbouring connected components 1550 or 1570. For each colour component, a plane of best fit for connected component 1560 is a compromise between firstly, a plane consistent with the image and gradient values of pixels in the part of connected component 1560 within the gradation region 1510, and secondly, a plane consistent with the image and gradient values of pixels in the part of connected component 1560 corresponding to the constant colour region 1530. Due to this compromise, for a combined region consisting of connected component 1560 and either of the neighbouring connected components 1550 or 1570, for at least one colour component there will be a significant difference between image values and image values obtained by extending the plane of best fit of connected component 1560 to the combined region. Consequently the merge cost between connected component 1560 and either of the neighbouring connected components 1550 or 1570 is comparatively high.

In contrast, consider the merge cost for merging the split connected component 1580 with either of the neighbouring connected components 1550 or 1570. For each colour component, a plane of best fit for connected component 1580 will be consistent with the image and gradient values of substantially all pixels of the connected component 1580 because it lies substantially within the gradation region 1510. For a combined region consisting of split connected component 1580 and either of the neighbouring connected components 1550 or 1570, for each colour component there will be little difference between image values and image values obtained by extending the plane of best fit of connected component 1580 to the combined region. In addition, for each colour component there will be little difference between image values and image values obtained by extending the plane of best fit of a neighbouring connected component 1550 or 1570 to the combined region. Consequently, the merge cost between split connected component 1580 and either of the neighbouring connected components 1550 or 1570 is comparatively low.

As indicated by the example arrangement of image data in FIGS. 15A, 15B and 15C, the design of the merge cost ensures that the merge cost between an ambiguous connected component and neighbouring connected components tends to be comparatively high, while the merge cost between connected components, or split connected components of a gradation region tends to be comparatively low. As a result, this merge cost is useful firstly in detecting ambiguous connected components, and secondly, in grouping connected components into gradation regions.

Referring again to FIG. 11, ambiguous connected components are detected and split in processing step 1140. In processing step 1150, using the merge cost, split connected components and unambiguous connected components are grouped together into gradation regions.

In processing step 1160, subsequent image processing is performed using grouped gradation regions. This subsequent image processing may include object shape analysis, object qualification with respect to required criteria, object recognition, analysis of overlapping objects, region grouping and page layout analysis, and finally, image encoding. As part of image encoding, gradation regions may be concisely represented in an electronic representation of the document image. A concise representation of a gradation region may include a vector description of the region outline and a vector description of the colour gradation.

Figure 12:
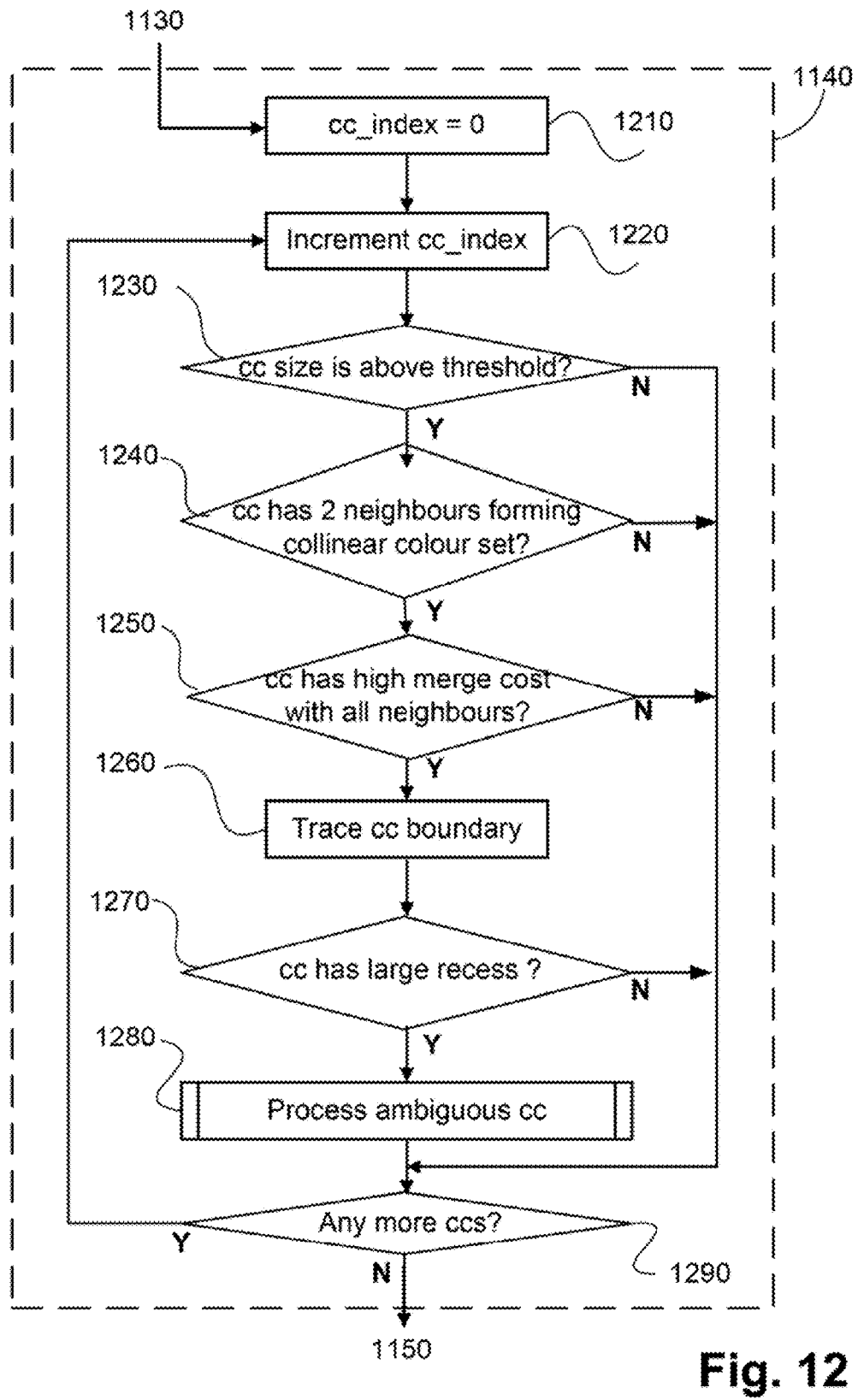
FIG. 12 is a flow diagram describing a processing step that identifies and splits ambiguous connected components within the colour image segmentation method of FIG. 11.

The method of identifying and splitting ambiguous connected components of processing step 1140 is now described with reference to FIG. 12. For the sake of description, it is assumed that data for connected components is stored in a list and retrieved using a list index, cc_index, which starts at 1. In processing step 1210, the list index, cc_index, is set to zero. In processing step 1220, cc_index is incremented. Processing steps 1230 through 1280 operate on a current connected component, abbreviated as "cc", retrieved using the current value of cc_index. In processing step 1230 the size of the current connected component, i.e. the number of pixels, is examined; if the size is not above a threshold then processing is finished for the current connected component and processing moves to step 1290; otherwise, if the size is above a threshold then processing of the current connected component continues at processing step 1240.

In processing step 1240 neighbouring connected components of the current connected component are examined: two neighbouring connected components, having size above a threshold, are sought such that their colours and the colour of the current connected component form a collinear colour set satisfying two criteria. The first criterion is that the colour of each of the neighbouring connected components has a colour distance from the colour of the current connected component which is less than a threshold. The second criterion is that the colours of the current connected component and the neighbouring connected components form a collinear colour set about the colour of the current connected component. Existence of such a collinear colour set is tested by forming two colour vectors, both colour vectors being based at the colour of the current connected component, with one colour vector directed to the colour of one neighbouring connected component and the other colour vector directed to the colour of the other neighbouring connected component. The colours form a collinear colour set about the colour of the current connected component if the dot product of the colour vectors, normalised by dividing by the vector lengths, is less than a negative threshold value. If there exist two neighbour connected components forming a collinear colour set, then processing moves to step 1250; otherwise, processing of the current connected component is finished, and processing moves to step 1290.

In processing step 1250 the merge cost of the current connected component with neighbouring connected components is examined. If the merge cost with all neighbouring connected components having size above a threshold value, is higher than a merge cost threshold, then processing moves to step 1260; otherwise, processing of the current connected component is finished and processing moves to step 1290.

In processing step 1260 the boundary of the current connected component is traced in preparation for the next processing step 1270 in which the current connected component is checked to see if it has a large recess. If the outer boundary of the current connected component departs significantly from a convex hull, then the current connected component is considered to have a large recess. The departure of an outer boundary point from the convex hull is measured as the distance of the outer boundary point from the corresponding straight line edge of the convex hull, measured normal to that straight line edge. If the current connected component has internal boundaries as well as an outer boundary then it is also considered to have a large recess. If the current connected component has a large recess then it is considered to be ambiguous and processing moves to step 1280, which is explained below with reference to FIG. 13; otherwise, processing of the current connected component is finished and processing moves to step 1290. Note that the processing of an ambiguous connected component in processing step 1280 may result in that connected component being split into two connected components. Split connected components are added to the end of the list of connected components and so in their turn, they are examined to see if they are ambiguous and should be split. In processing step 1290, cc_index is compared to the number of connected components; if there are more connected components, processing moves to step 1220 to increment cc_index and process the next connected component; if there are no more connected components, then processing step 1140 is complete.

Figure 16A:
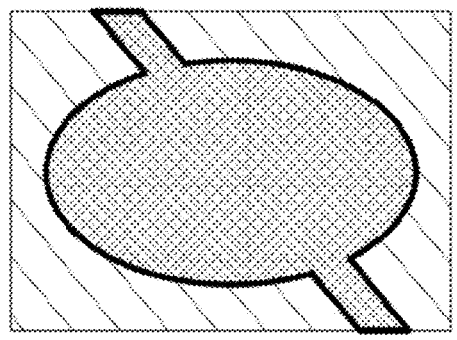
FIGS. 16A, 16B, 16C and 16D are representations of a simple image consisting of an elliptical constant coloured region overlying a background gradation region as the image undergoes segmentation processing.
Figure 16B:
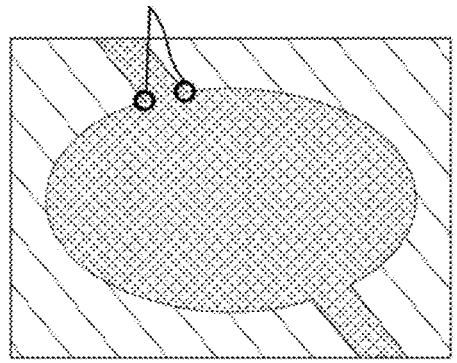
Figure 16C:
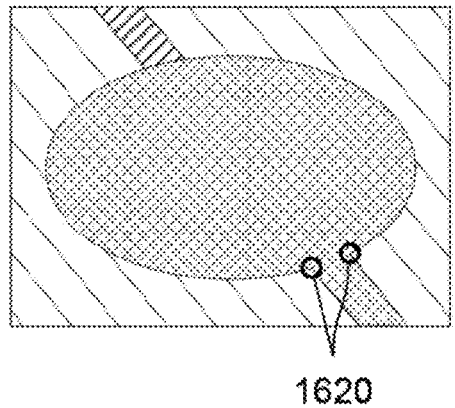
Figure 16D:
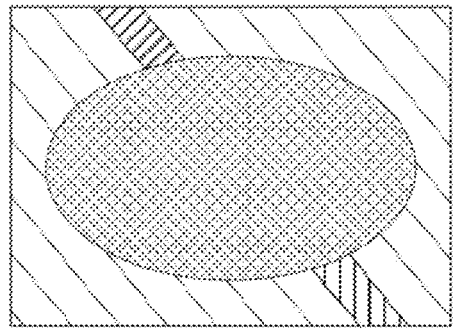

In order to explain the processing performed for an ambiguous connected component, examples of major types of ambiguous components are explained using FIGS. 16A, 16B, 16C and 16D and FIGS. 17A, 17B, 17C and 17D. FIG. 16A shows connected components of a simple image consisting of an elliptically shaped constant colour region overlying a gradation region. The shaded connected component, also shown with a bold border is ambiguous. It contains pixels of the overlying elliptical constant colour region together with pixels of similar colour of the underlying gradation region. Note that, apart from where it touches the image border, the ambiguous connected component has four corner points on the boundary. Two of these corner points are circled and labelled 1610 in FIG. 16B and the other two corner points are circled and labelled as 1620 in FIG. 16C. These four boundary points are good end points at which to construct a line segment to split the ambiguous connected component. FIG. 16C shows the result of splitting using the two corner points labelled 1610; part of the ambiguous connected component is now shown diagonally shaded; the remaining part of the ambiguous connected component is still ambiguous and contains the other two corner points labelled 1620. Finally, FIG. 16D shows the result of splitting that remaining part using the other two corner points 1620.

Figure 17A:
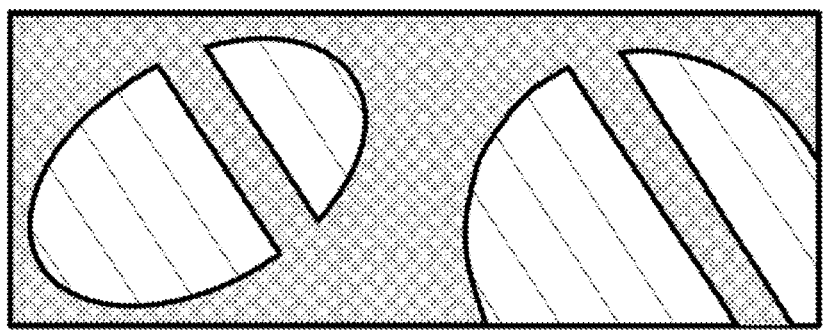
FIGS. 17A, 17B, 17C and 17D are representations of a simple image consisting of an elliptical gradation region and a circular gradation region overlying a constant colour background region as the image undergoes segmentation processing.

FIG. 17A shows connected components of a simple image consisting of an elliptically shaped gradation region and part of a circularly shaped gradation region overlying a constant colour region. The shaded connected component of FIG. 17A is ambiguous. It contains pixels of the underlying constant colour region together with pixels of similar colour of the overlying gradation regions. In this case, the boundary of the ambiguous connected component consists of three sections: an outer or external boundary and two inner or internal boundaries surrounding the pieces of the elliptical region not belonging to the connected component. Unlike the ambiguous connected component of FIG. 16A, which is an example of a simply connected image region, the ambiguous connected component of FIG. 17A is a multiply connected image region (i.e. there exist loops or closed paths within the region which cannot be continuously shrunk to a point while all points of the path stay within the region). To split the multiply connected ambiguous connected component shown shaded in FIGS. 17A and 17B and restore the approximate shape of the elliptical gradation region as shown in FIGS. 17C and 17D, it is necessary to use two line segments and two pairs of boundary points. FIG. 17C shows the result of splitting using the two pairs of corner points labelled 1710 and 1720 in FIG. 17B; part of the ambiguous connected component is now shown diagonally shaded; the remaining part of the ambiguous connected component is still ambiguous. Note that for each line segment of this splitting operation, each end point is on a different internal boundary of the ambiguous connected component to the other end point. Also, the two line segments have their end points on the same two internal boundaries. The remaining part of the ambiguous connected component shown in FIG. 17C is now simply connected and contains the pair of corner points labelled 1730. FIG. 17D shows the result of splitting that remaining part using the pairs of corner points 1730.

In general, an ambiguous connected component may be simply connected or multiply connected. When it is simply connected it can be split using a line segment having a pair of boundary points as end points. When it is multiply connected it can be split using two line segments having two pairs of boundary points as end points; with the end points for each line segment belonging to the same pair of different sections of the boundary. Note that a multiply connected ambiguous connected component can also be split using a single line segment, provided that the pair of boundary points which are end points of the line segment are on the same section of the boundary. This case is also illustrated in FIGS. 17A, 17B, 17C and 17D by performing the splitting using the pair of corner points 1730 before performing the splitting using the two pairs of corner points 1710 and 1720.

The processing performed for an ambiguous connected component in step 1280 is now described with reference to FIG. 13. Firstly, in processing step 1310, the previously traced boundary of the ambiguous connected component derived using processing step 1260 is simplified. The result of tracing the ambiguous connected component boundary in processing step 1260 is a list of pixel corners for each separate section of the boundary of the connected component. These pixel corners can be considered as vertices of a straight-edged representation of the boundary of the connected component. The boundary simplification of processing step 1310 forms a reduced set of vertices which still approximates the boundary of the connected component while removing smaller bumps and indents.

This processing uses a cost for removing a vertex of the boundary given by the following equation $$K(s_1, s_2) = \frac{\beta(s_1, s_2) l(s_1) l(s_2)}{l(s_1) + l(s_2)}. \quad (1)$$

This equation defines the removal cost $K(s_1,s_2)$ for a vertex between two line segments $s_1$, $s_2$ using the unsigned turn angle between the line segments $\beta(s_1,s_2)$ and lengths of the two line segments, normalised by the total length of line segments of the boundary, $l(s_1)$, $l(s_2)$. Here, the turn angle at the vertex between a pair of neighbouring line segments of a polygon is the angular rotation of the extension through the vertex of one line segment to the other line segment.

A vertex of a boundary of straight line segments is considered to be reflex or non-reflex depending on the direction of the turn angle. Assuming line segments either side of a vertex are ordered according to a clockwise trace of the boundary, for the case when a vertex is on the outer boundary, the vertex is considered to be reflex when the turn angle from the extension of the preceding line segment for the vertex to the succeeding line segment is an anti-clockwise angle, and for the case when the vertex is on an internal boundary, the vertex is considered to be reflex when the turn angle is a clockwise angle.

The ambiguous connected component boundary simplification processing of step 1310 firstly, repeatedly removes the non-reflex connected component vertex with the least removal cost until there are no more non-reflex vertices with removal cost below a threshold, and secondly repeatedly removes the connected component reflex vertex with the least removal cost until there are no more reflex vertices with removal cost below the threshold. This approach to removing low cost vertices encourages the preservation of the position of reflex vertices in the simplified boundary. We refer to vertices remaining in the representation of the boundary of an ambiguous connected component, following the boundary simplification processing step 1310, as "polygonal vertices", while we refer to vertices resulting from the boundary tracing processing step 1260 simply as "vertices".

The processing of an ambiguous connected component in step 1320 and subsequent steps, has the purpose of firstly searching for end points of one or two line segments which are suitable for splitting the connected component, and secondly, if such a line segment or segments are found, splitting the connected component. The strategy for searching for suitable line segments for splitting an ambiguous connected component is explained with reference to FIG. 18 and FIGS. 19A, 19B and 19C.

Figure 18:
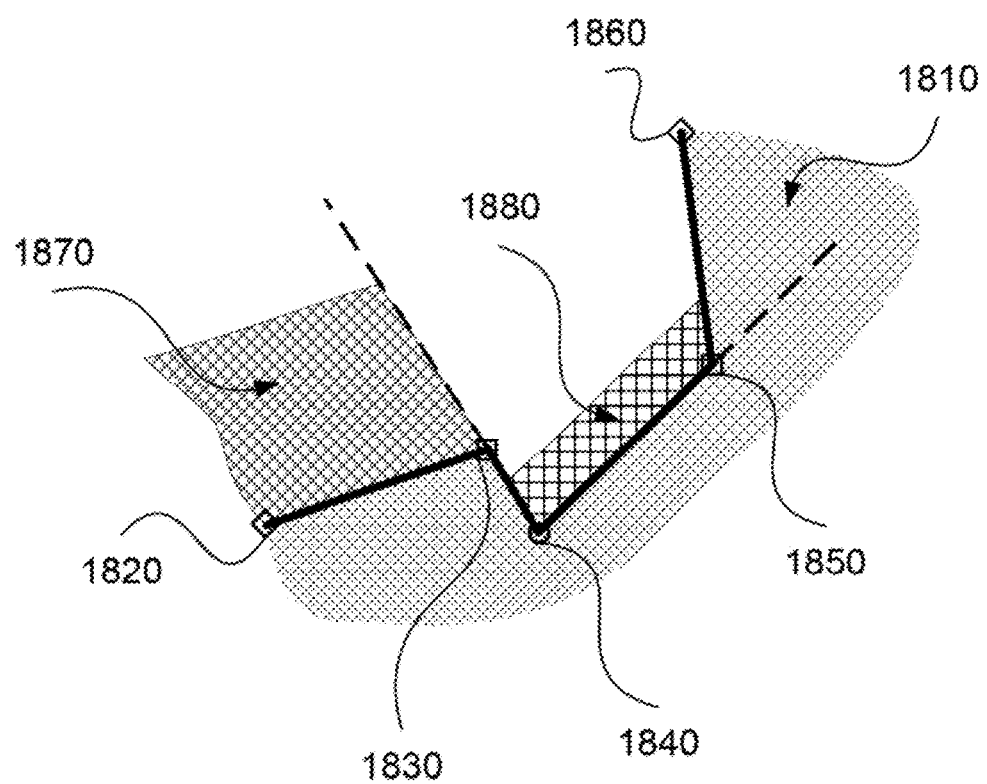
FIG. 18 is a representation of an ambiguous connected component in the vicinity of a reflex polygonal vertex of its boundary.

FIG. 18 shows part of an example ambiguous connected component drawn as the shaded region 1810, in the vicinity of a reflex polygonal vertex 1840. FIG. 18 also shows part of the simplified external boundary of the ambiguous connected component 1810 consisting of polygonal vertices 1820, 1830, 1840, 1850 and 1860 and straight line segments between these vertices. Other polygonal vertices and straight line segments of the simplified boundary of the ambiguous connected component 1810 are not shown. Both polygonal vertices 1840 and 1850 are reflex. Associated with each polygonal vertex of a connected component are two straight line segments immediately to either side of the vertex in the polygonal representation of the boundary of the connected component. In this description, these straight line segments are referred to as the "arms" of the vertex. Associated with the reflex polygonal vertex 1840 are the two arms between the vertex and neighbouring vertices 1830 and 1850. In FIG. 18 these arms are shown with dashed extensions.

Figure 19A:
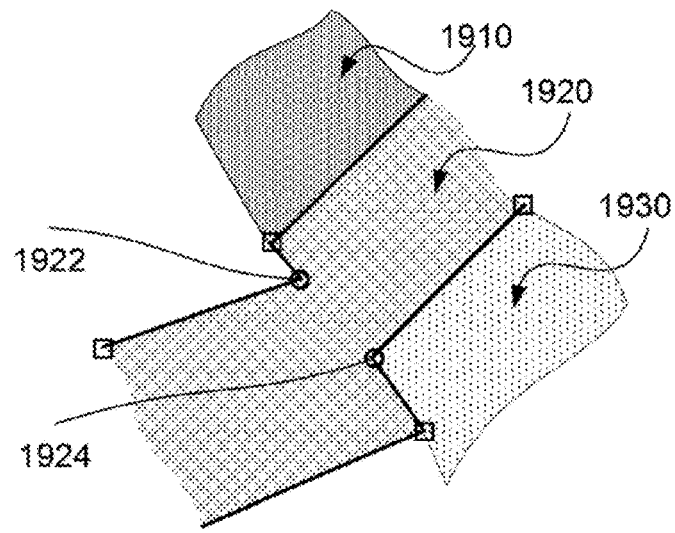
FIGS. 19A, 19B and 19C are representations of configurations of an ambiguous connected component in the vicinity of a pair of reflex polygonal vertices which can be used to split the ambiguous region.
Figure 19B:
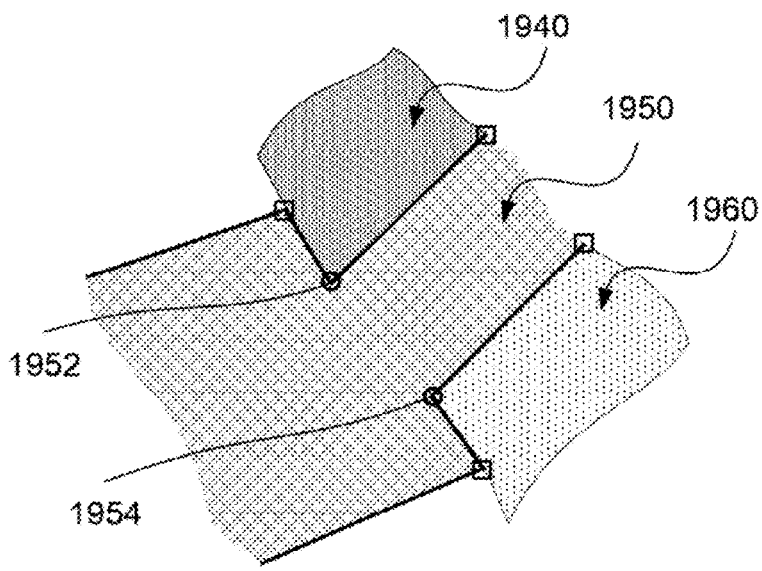
Figure 19C:
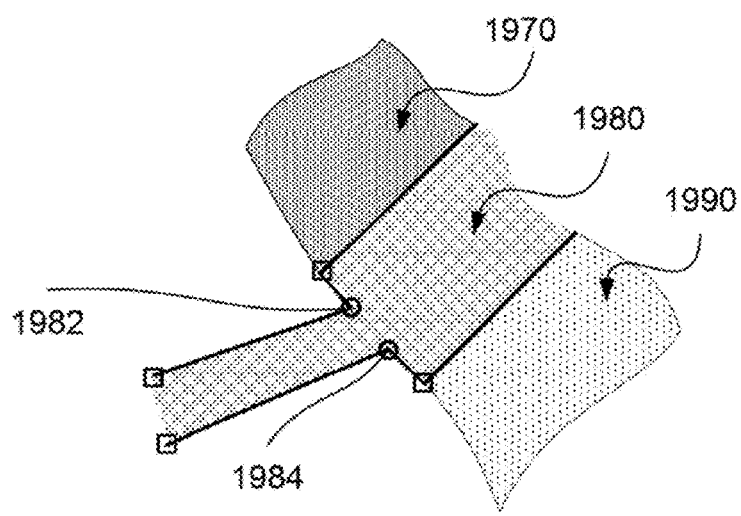

FIGS. 19A, 19B and 19C show parts of ambiguous connected components and parts of their polygonised boundaries. These figures illustrate different configurations of an ambiguous region arising due to the presence in the original image of a gradation region overlying or underlying a region which includes a constant colour region similar to one of the colours of the gradation region. FIG. 19A has a similar arrangement of connected components as FIG. 15B which corresponds to a gradation region lying next to a constant colour region as depicted in FIG. 15A. The ambiguous connected component in each of FIGS. 19A, 19B and 19C consists of pixels of a gradation region and pixels of a neighbouring constant colour region. In these figures, reflex polygonal vertices of the ambiguous connected component are indicated with small circles and polygonal vertices immediately to either side of the reflex polygonal vertices are indicated with small squares. In each of the figures, a suitable line segment to use to split the ambiguous connected component has end points at the two reflex polygonal vertices. Also in each figure, there exist two neighbouring connected components in the vicinity of each of the reflex polygonal vertices, such that the two neighbouring connected components and the ambiguous connected component have colours which form a collinear colour set as explained above in association with processing step 1240. That is, each of the neighbouring colour components has a colour similar to the colour of the ambiguous connected component and the colours of these connected components are approximately collinear in colour space, centred about the colour of the ambiguous connected component. The three configurations of an ambiguous region shown in FIGS. 19A, 19B and 19C arise when a gradation region neighbours a constant coloured region, depending on the size of the constant colour region, the slope of the gradation region and the position of the constant colour region relative to the similar coloured part of the gradation region. Note that the positions of the neighbouring connected components which form a collinear colour set are different relative to the arms of the reflex polygonal vertices.

Returning to FIG. 18, two connected components 1870, 1880, shown with cross-hatching, are adjacent to the example ambiguous component 1810. These neighbouring connected components are in different positions relative to the reflex polygonal vertex 1840 of the ambiguous connected component. Neighbouring connected component 1880 extends from the reflex polygonal vertex 1840 along both arms of that polygonal vertex. We refer to such a neighbouring connected component as a neighbouring connected component at the reflex polygonal vertex. Neighbouring connected component 1870 extends beyond polygonal vertex 1830 towards polygonal vertex 1820. We assume that polygonal vertices of ambiguous connected component 1810 are in clockwise order, so that polygonal vertex 1830 is the previous polygonal vertex to the polygonal vertex 1840 and we refer to the boundary line segment between polygonal vertices 1820 and 1830 as the previous "forearm" of polygonal vertex 1840. So, the neighbouring connected component 1870 is a neighbouring connected component positioned at the previous forearm of polygonal vertex 1840. Neighbouring connected component 1880 which is positioned at reflex polygonal vertex 1840 and neighbouring connected component 1870 which is positioned at a forearm of reflex polygonal vertex 1840 are both possible members of a collinear colour set which can provide evidence for reflex polygonal vertex 1840 to be matched with another reflex polygonal vertex. Note that for a neighbouring connected component positioned at a forearm of a polygonal vertex to be able to provide evidence for matching the polygonal vertex, the angle at the corresponding neighbouring polygonal vertex, i.e. polygonal vertex 1830 in FIG. 18, must be non-reflex.

The configurations in FIGS. 19A, 19B and 19C of an ambiguous connected component forming a collinear colour set with neighbouring connected components are now described in relation to the reflex polygonal vertices suitable for constructing a line segment to split the ambiguous component. In FIG. 19A neighbouring connected component 1910 is positioned at the next forearm of reflex polygonal vertex 1922 and neighbouring connected component 1930 is positioned at the reflex polygonal vertex 1924. Note also that in FIG. 19A, the next arm of reflex polygonal vertex 1922 is approximately collinear with the next arm of reflex polygonal arm 1924.

In FIG. 19B neighbouring connected component 1940 is positioned at the reflex polygonal vertex 1952 and neighbouring connected component 1960 is positioned at the reflex polygonal vertex 1954. In this figure, the previous arm of reflex polygonal vertex 1952 is approximately collinear with the next arm of reflex polygonal vertex 1954.

In FIG. 19C neighbouring connected component 1970 is positioned at the next forearm of reflex polygonal vertex 1982 and neighbouring connected component 1990 is positioned at the previous forearm of reflex polygonal vertex 1984. In this figure, the next arm of reflex polygonal vertex 1982 is approximately collinear with the previous arm of reflex polygonal vertex 1984.

Figure 14:
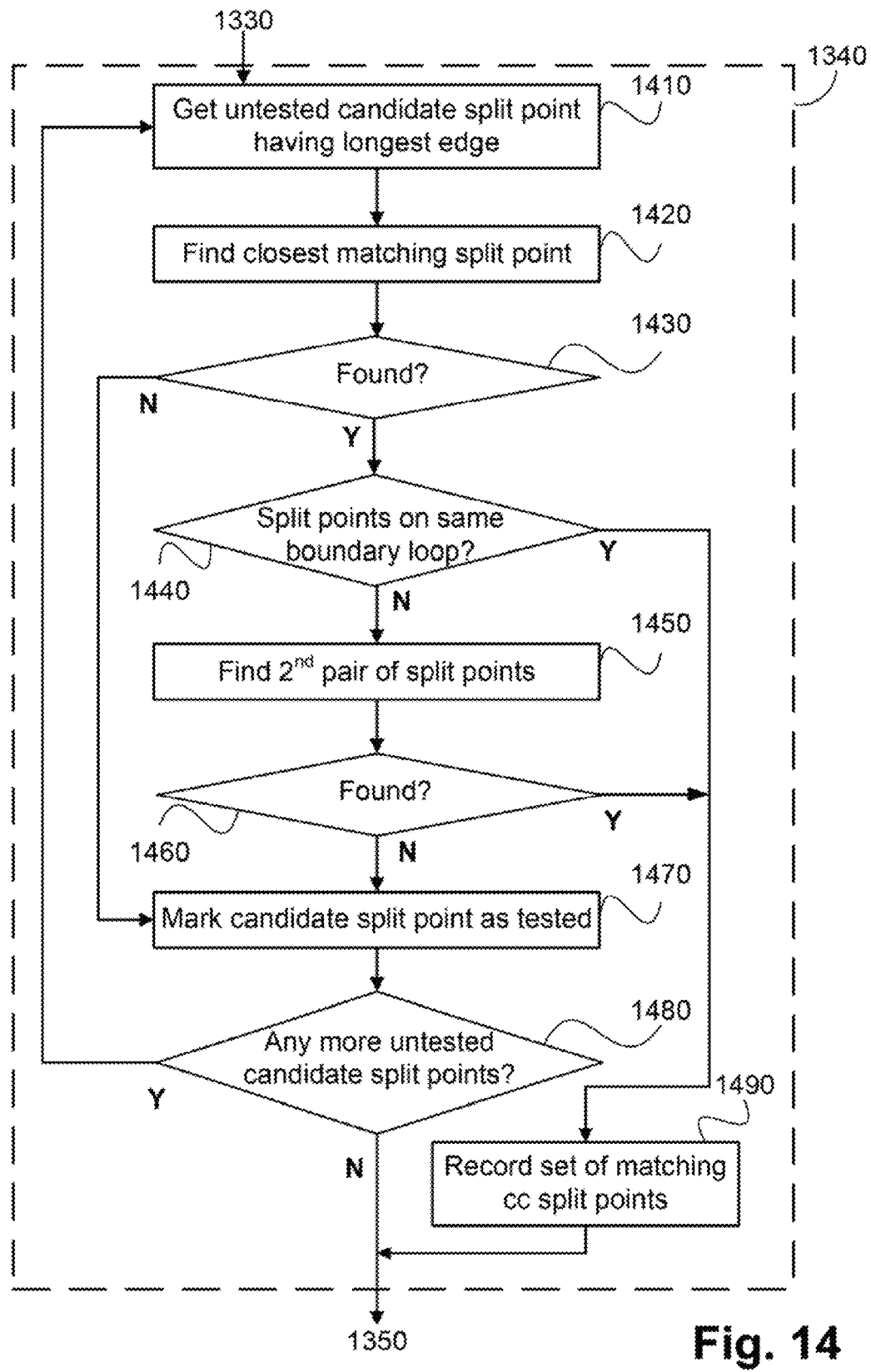
FIG. 14 is a flow diagram illustrating the operation of a sub-processing step that finds a set of matching split points for an ambiguous component.

These configurations are the basis for finding candidate split points of an ambiguous connected component in processing step 1320 and later for finding a best matching split point in processing step 1420 of FIG. 14.

Figure 13:
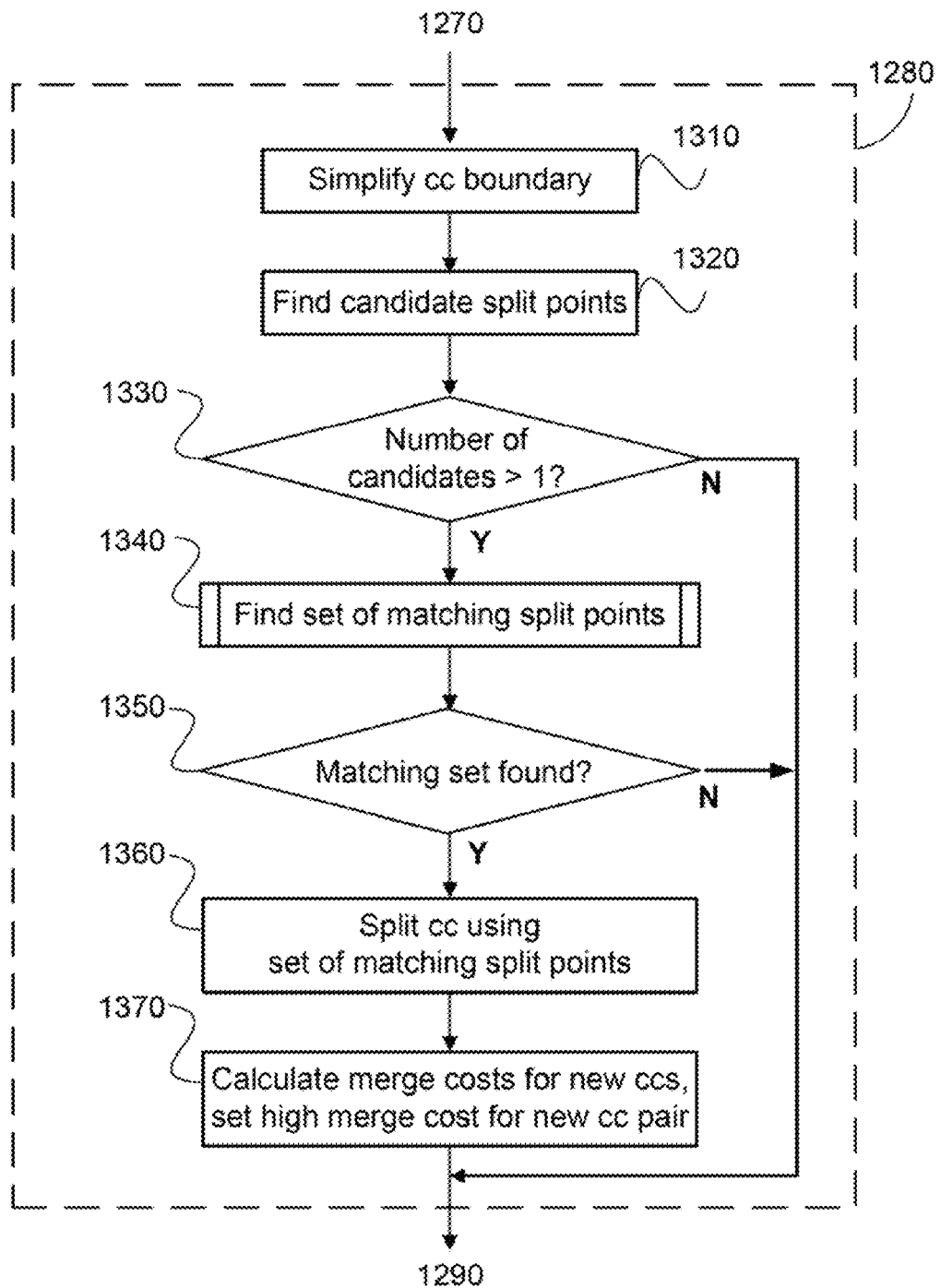
FIG. 13 is a flow diagram illustrating the operation of a sub-processing step that processes an ambiguous connected component.

The explanation of the processing of an ambiguous connected component is now resumed with reference to FIG. 13. Following simplification of the connected component boundary in processing step 1310 which determines polygonal vertices of the boundary, processing proceeds to step 1320 to find candidate split points, being possible suitable end points of a line segment for splitting the ambiguous connected component. Candidate split points are reflex polygonal vertices which either have a suitable neighbouring connected component at the reflex polygonal vertex or a suitable neighbouring connected component at the previous or the next forearm of the reflex polygonal vertex. A suitable neighbouring connected component is one which firstly has a colour close to the colour of the ambiguous connected component and secondly, has a colour which, together with the colour of another neighbouring connected component forms a collinear colour set with the colour of the ambiguous connected component.

In processing step 1330 the number of candidate split points found in the previous step is examined. If the number of candidates found is greater than one, so that there is the possibility that a matching pair of candidates exist, then processing proceeds to step 1340; otherwise processing of the ambiguous connected component is complete.

In processing step 1340, candidate split points are analysed to see if a best pair of matching split points can be found. This processing is described with reference to FIG. 14. In processing step 1410 an untested candidate split point, i.e. reflex polygonal vertex, is selected. The selected untested candidate split point is the one which has a suitable neighbouring connected component having the longest edge with the ambiguous connected component, either extending from the reflex polygonal vertex, or, if the suitable neighbouring connected component is positioned at a forearm of the reflex polygonal vertex, extending away from the polygonal vertex away along the forearm of the reflex polygonal vertex.

In processing step 1420, a search is performed to try to find the closest candidate split point which matches the current untested candidate split point. A candidate split point is considered to match another candidate split point if all the following three conditions are satisfied. The first condition is that one arm of one split point should be approximately collinear with one arm of the other split point. Collinearity of an arm of one split point, i.e. reflex polygonal vertex, with an arm of another split point, i.e. reflex polygonal vertex, is tested by forming four vectors based at the ends of both arms and terminating at both reflex polygonal vertices. If the dot product of the pair of vectors based at the end of the first arm, and the dot product of the pair of vectors based at the end of the second arm, with all vectors normalised by the vector lengths, are both greater than a threshold value, then the arms are considered to be collinear.

The second condition is that, consistent with the configuration of the collinear arms, a neighbouring connected component of one candidate split point and a neighbouring connected component of the other candidate split point should form a collinear colour set consistent with the possible split of the ambiguous connected component using the line segment between the reflex polygonal vertices.

Figure 20A:
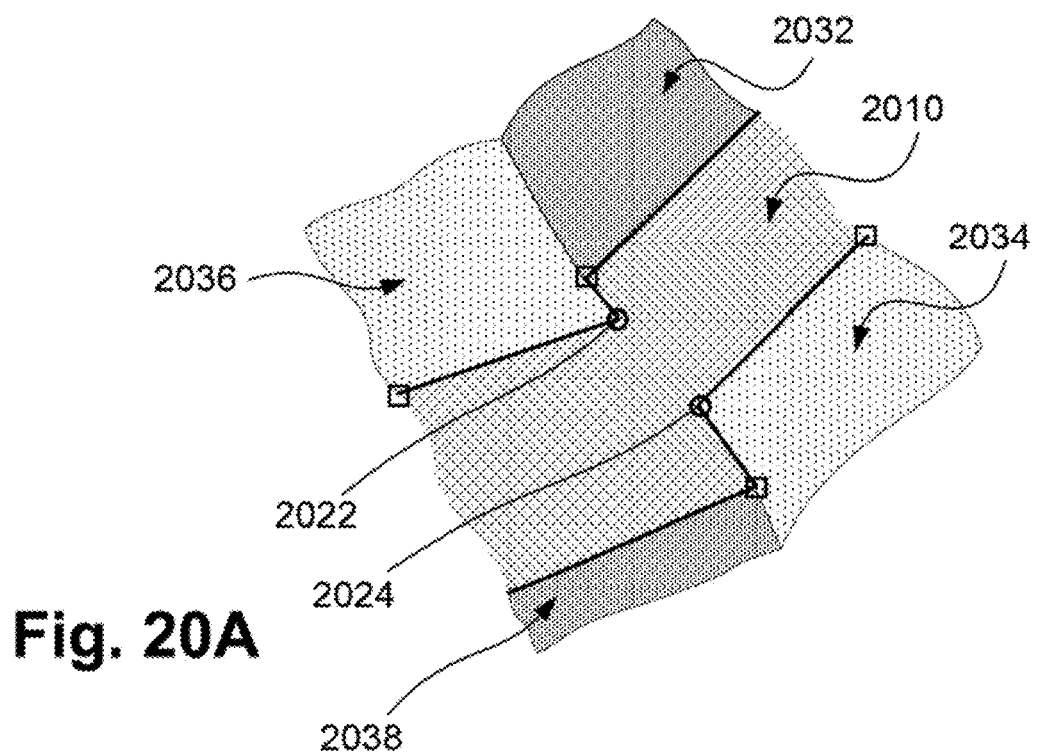
FIGS. 20A and 20B are representations of configurations of a pair of matching reflex polygonal vertices suitable for splitting an ambiguous connected component.

This second condition is further explained with reference to FIGS. 20A and 20B. FIG. 20A shows one configuration of collinear arms for a pair of reflex polygonal vertices 2022 and 2024 of an ambiguous connected component 2010. In this configuration the non-collinear arm of one reflex polygonal vertex is on the other side of the line segment, between the two reflex polygonal vertices, to the non-collinear arm of the other reflex polygonal vertex. For this configuration, a neighbouring connected component at the forearm of the non-collinear arm of one reflex polygonal vertex and a neighbouring connected component at the other reflex polygonal vertex can form a collinear colour set consistent with the possible split of the ambiguous connected component. That is, in FIG. 20A, either the pair of neighbouring connected components 2032 and 2034 or the pair of neighbouring connected components 2036 and 2038 can form a collinear colour set consistent with the possible split.

Figure 20B:
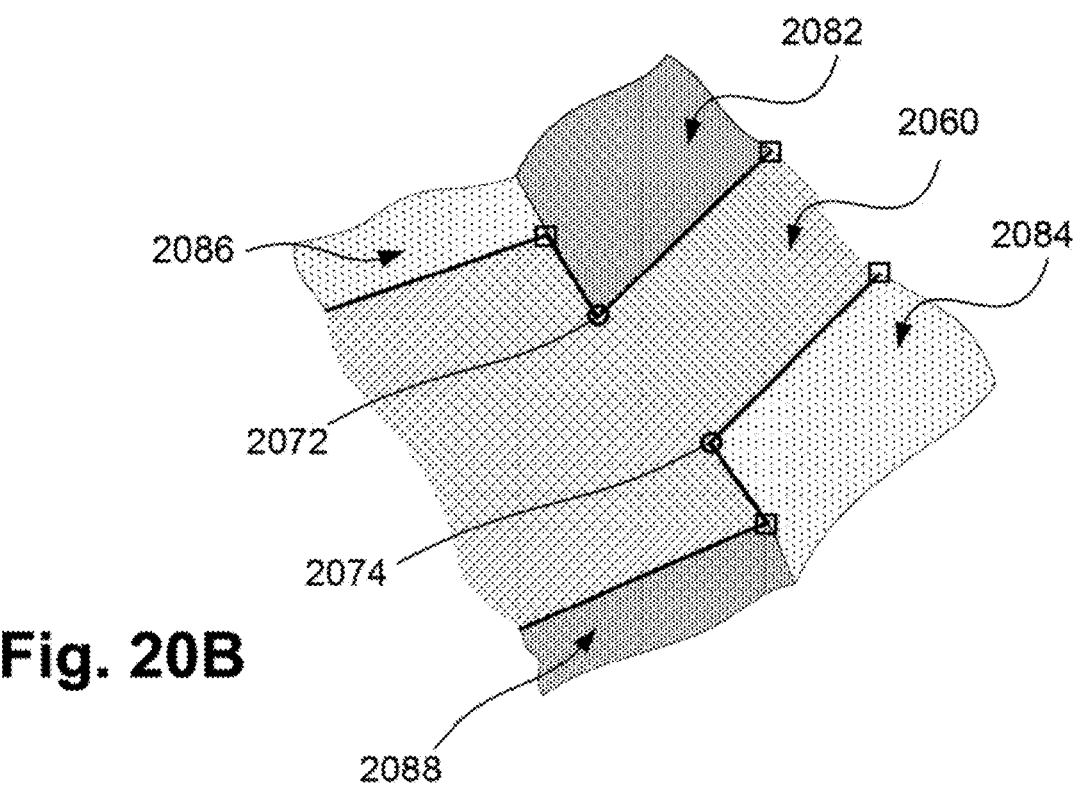

FIG. 20B shows the alternative configuration of collinear arms for a pair of reflex polygonal vertices 2072 and 2074 of an ambiguous connected component 2060. In this configuration the non-collinear arm of one reflex polygonal vertex is on the same side of the line segment between the two reflex polygonal vertices, to the non-collinear arm of the other reflex polygonal vertex. For this configuration, a neighbouring connected component at one reflex polygonal vertex and a neighbouring connected component at the other reflex polygonal vertex can form a collinear colour set consistent with the possible split of the ambiguous connected component. That is, in FIG. 20B, the pair of neighbouring connected components 2082 and 2084 can form a collinear colour set consistent with the possible split. Alternatively, for this configuration, a neighbouring connected component at the forearm of the non-collinear arm of one reflex polygonal vertex and a neighbouring connected component at the forearm of the other reflex polygonal vertex can form a collinear colour set consistent with the possible split. That is, the pair of neighbouring connected components 2086 and 2088 can also form a collinear colour set consistent with the possible split.

A third condition for a candidate split point to match another candidate split point is that pixels along the line segment between the two points must belong to the ambiguous connected component. In processing step 1430, if a matching split point is found for the current candidate split point, satisfying these three conditions processing moves to step 1440; otherwise processing moves to step 1470. In processing step 1440 the pair of matching candidate split points are examined to see if they both belong to the external boundary or the same internal boundary of the ambiguous connected component. If they do indeed belong to the same section, i.e. loop, of the boundary then the matching split points are recorded in processing step 1490 which also completes the processing of step 1340.

Figure 17B:
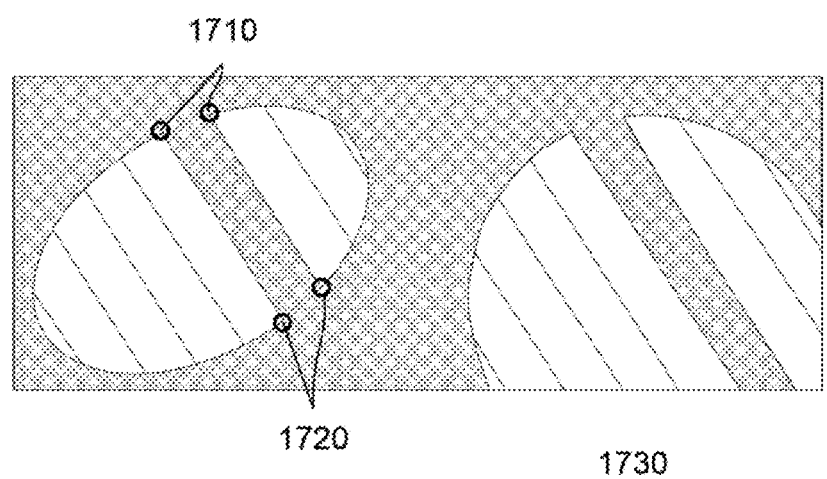
Figure 17C:
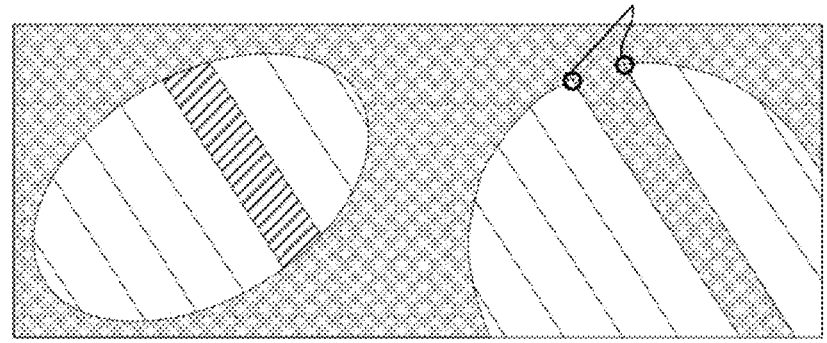
Figure 17D:
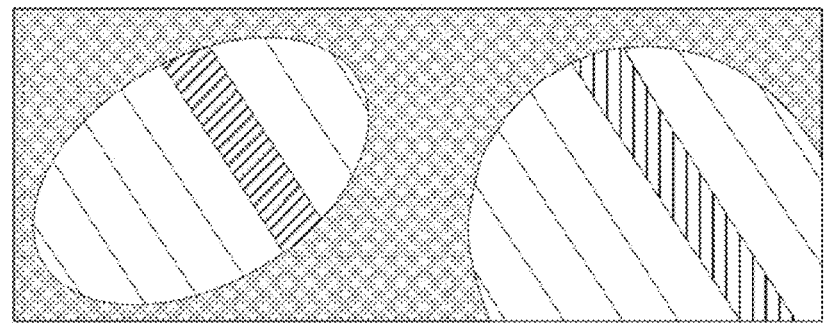

If the pair of matching candidate split points do not both belong to the external boundary or the same internal boundary of the ambiguous connected component, then, as previously explained in relation to FIGS. 17A, 17B and 17C, a second pair of matching split points is required to be able to split the ambiguous connected component into two split connected components, and processing moves to step 1450. In processing step 1450 a search is performed for a second pair of matching split points. Consistent with the configuration of the pair of matching split points already found, a reflex polygonal vertex is sought along the boundary of each of the matching split points within the neighbouring connected components which formed a collinear colour set for the pair of matching split points in processing step 1420. In order to be a valid second pair of split points these polygonal vertices must have arms, directed from the reflex polygonal vertices further away along the boundary from the first pair of split points, which are approximately collinear as described previously in processing step 1420. Further, to be a valid second pair of split points, pixels along the line segment between the split points must belong to the ambiguous connected component. If a valid second pair of split points is found then the two pairs of matching split points are recorded in processing step 1490 which also completes the processing of step 1340. If no second pair of split points is found then processing moves to step 1470.

In processing step 1470 the current candidate split point is marked as tested and processing moves to step 1480 where it is determined whether there are any further untested candidate split points. If there are further candidate split points then processing returns to step 1410 to operate on the next untested candidate split point; otherwise processing of step 1340 is complete.

Following the search for a matching set of split points in processing step 1340, processing proceeds to step 1350 where a check is made whether a matching set of split points has been found. If a set has not been found then processing of this ambiguous connected component in step 1280 is complete. If a set of matching split points has been found then processing moves to step 1360 to split the ambiguous connected component using the set of matching split points. This is achieved in two steps. Firstly, pixels of the ambiguous connected component which lie either side of the single line segment or pair of line segments, corresponding to the matching split points, are assigned to one of two new connected components. Secondly, remaining pixels of the ambiguous connected components are assigned to one of the two new connected components using a flood fill operation.

Processing then proceeds to step 1370 in which merge costs are calculated for pairs of connected components which include one of the new connected components. A high merge cost is set between the pair of new connected components. This allows the split connected components to be further split if necessary by not causing processing step 1250 to fail. It also prevents the split connected components from being merged into the same gradation region in processing step 1150. This completes the description of the processing of an ambiguous connected component of step 1280. It also completes the description of the processing to identify and split ambiguous connected components of step 1140.

A method of segmenting a colour image into gradation regions has been described which forms connected components of similar colour, calculates a merge cost between pairs of neighbouring connected components which measures the extent to which each of the pair of connected components can be considered to be part of a gradation region containing the other connected component of the pair, identifies using the merge cost ambiguous connected components, being those which are likely to include pixels both of a gradation region and a neighbouring region of similar colour, splits ambiguous connected components using characteristics of gradation regions, and groups unambiguous connected components and split connected components using the pair-wise merge cost.

This method allows efficient segmentation as it avoids extensive pixel-level processing by forming connected components of similar colour and operating principally on connected components rather than on pixels. This pair-wise region merge cost allows efficient identification of ambiguous connected components by a progressive application of tests; it also allows efficient connected component merging. Extensive processing is associated with splitting a connected component; however, the overall computation is minimised by restricting this processing to ambiguous connected components.

INDUSTRIAL APPLICABILITY

The arrangements described are applicable to the computer and data processing industries and particularly for the interpreting of bitmap images of documents into an object-based high-level form.

The foregoing describes only some embodiments of the present invention, and modifications and/or changes can be made thereto without departing from the scope and spirit of the invention, the embodiments being illustrative and not restrictive.

We claim:

1. A method of generating an electronic document having an enclosed region with a fill colour, the method comprising:
   (a) receiving a digital representation of a source document, the source document containing an enclosed region and at least one corresponding background region, the enclosed region overlapping at least a portion of the background region;
   (b) determining a fill colour for the enclosed region from the digital representation;
   (c) determining a reference background colour for the enclosed region from the corresponding background region of the digital representation;
   (d) assigning a transparent fill colour to the encoded region on a basis of a comparison result indicating that a colour difference between the determined fill colour and the determined reference background colour is less than a threshold regarding a similarity of the determined fill colour and the determined reference background colour; and
   (e) storing the enclosed region with the transparent fill colour to generate an electronic document.

2. The method according to claim 1, wherein the source document comprises a plurality of enclosed regions including said enclosed region, the method comprising:
   (a) assigning a reference background flag to each of the plurality of enclosed regions based on a comparison of the determined fill colour for each of the enclosed regions with a corresponding reference background colour; and
   (b) storing background image data and, for each of the plurality of enclosed regions classified as a foreground region, storing a fill colour and reference background flag as an intermediate representation for the electronic document.

3. The method according to claim 2, further comprising:
   displaying the electronic document in one of a plurality of modes based on a selection to draw the background image, wherein the transparent fill colour is controlled by the selection.

4. The method according to claim 2, further comprising:
   converting the electronic document to one of a plurality of formats based on a selection to output the background image data, wherein the transparent fill colour is controlled by the selection.

5. The method according to claim 2, further comprising:
   displaying the electronic document in one of a plurality of modes based on a predetermined option, wherein each mode is a configuration based on a selection to draw the background image and a selection to enable transparent fills.

6. The method according to claim 2, further comprising converting the electronic document to one of a plurality of formats based on a predetermined option, wherein each format is a configuration based on a selection to output the background image data and a selection to enable transparent fills.

7. The method according to claim 1, wherein the reference background colour for the enclosed region is a page colour of the source document.

8. The method according to claim 1, wherein the reference background colour for the enclosed region is determined according to a colour of a region that encloses the enclosed region.

9. The method according to claim 1, wherein the source document comprises a plurality of non-transparent enclosed regions having similar colours with a colour difference less than a predetermined threshold, the method further comprising the step of consolidating fill colours of the plurality of non-transparent enclosed regions.

10. A method of generating an electronic document having an editable table, the method comprising the steps of:
    (a) receiving a digital representation of a source document, the document containing at least one table having a plurality of cells;
    (b) determining a reference background colour for the table from the digital representation;
    (c) determining a fill colour for each of the plurality of cells from the digital representation; and
    (d) assigning a transparent fill colour to at least one of the plurality of cells on a basis of a comparison result indicating that a colour difference between the determined fill colour for the at least one cell and the determined reference background colour of the table is less than a threshold regarding a similarity of the determined fill colour and the determined reference background colour.

11. The method as claimed in claim 10, wherein the reference background colour for the table is a page colour of the source document.

12. The method as claimed in claim 10, wherein the reference background colour for the table is a colour of a region that encloses the table.

13. The method as claimed in claim 10, further comprising consolidating fill colours of at least two non-transparent cells of the plurality of cells based on a comparison of the determined fill colours of the at least two non-transparent cells.

14. The method according to claim 1, wherein the digital representation comprises scanned data of the source document.

15. The method according to claim 10, wherein the digital representation comprises scanned data of the source document.

16. A non-transitory computer readable storage medium having a program recorded thereon, the program being executable by a computer apparatus to generate an electronic document having an enclosed region with a fill colour, the program comprising:
    code for receiving a digital representation of a source document, the source document containing an enclosed region and at least one corresponding background region, the enclosed region overlapping at least a portion of the background region;
    code for determining a fill colour for the enclosed region from the digital representation;
    code for determining a reference background colour for the enclosed region from the corresponding background region of the digital representation;
    code for assigning a transparent fill colour to the encoded region on a basis of a comparison result indicating that a colour difference between the determined fill colour and the determined reference background colour is less than a threshold regarding a similarity of the determined fill colour and the determined reference background colour; and
    code for storing the enclosed region with the transparent fill colour to generate an electronic document.

17. Computer apparatus comprising at least a processor and a memory coupled to the processor, the memory having stored thereon a program executable by the processor for generating an electronic document having an enclosed region with a fill colour, the program comprising:
    code for receiving a digital representation of a source document, the source document containing an enclosed region and at least one corresponding background region, the enclosed region overlapping at least a portion of the background region;

code for determining a fill colour for the enclosed region from the digital representation;

code for determining a reference background colour for the enclosed region from the corresponding background region of the digital representation;

code assigning a transparent fill colour to the encoded region on a basis of a comparison result indicating that a colour difference between the determined fill colour and the determined reference background colour is less than a threshold regarding a similarity of the determined fill colour and the determined reference background colour; and code for storing in the memory the enclosed region with the transparent fill colour to generate an electronic document.

18. The computer apparatus according to claim 17, further comprising a reproduction device being at least one of a video display and a printer, coupled to the processor, and configured to reproduce the generated electronic document.

* * * * *